(12) United States Patent
Ma et al.

(10) Patent No.: US 12,519,598 B2
(45) Date of Patent: Jan. 6, 2026

(54) SCHEDULING OFFSET FOR HYBRID AUTOMATIC REPEAT REQUEST ACKNOWLEDGEMENT CODEBOOK

(71) Applicant: QUALCOMM Incorporated, San Diego, CA (US)

(72) Inventors: Liangping Ma, San Diego, CA (US); Umesh Phuyal, San Diego, CA (US); Changhwan Park, San Diego, CA (US); Alberto Rico Alvarino, San Diego, CA (US); Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 18/304,965

(22) Filed: Apr. 21, 2023

(65) Prior Publication Data

US 2023/0344605 A1   Oct. 26, 2023

Related U.S. Application Data

(60) Provisional application No. 63/363,539, filed on Apr. 25, 2022.

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ... H04L 5/0055; H04L 1/1812; H04L 1/1861; H04L 1/1864; H04L 1/1887; H04L 1/1896; H04L 1/1854

USPC .......................................................... 370/329
See application file for complete search history.

(56) References Cited

U.S. PATENT DOCUMENTS

| | | | |
|---|---|---|---|
| 11,552,700 B2* | 1/2023 | Charbit | H04L 1/1851 |
| 2022/0232564 A1* | 7/2022 | Behravan | H04L 1/1854 |
| 2023/0023656 A1* | 1/2023 | Rastegardoost | H04W 72/0446 |
| 2024/0334435 A1* | 10/2024 | Okano | H04W 72/04 |

OTHER PUBLICATIONS

Asia Pacific Telecom: "Discussion on Physical Layer Control Procedures for NTN", 3GPP TSG-RAN WG1 Meeting #98-Bis, R1-1910845, Oct. 14-20, 2019 (From Applicant's IDS) (Year: 2019).*
Samsung: "On Timing Relationship Enhancements", 3GPP TSG RAN WG1 #104-e, R1-2101244, Jan. 25-Feb. 5, 2021 (From Applicant's IDS) (Year: 2021).*
IMediatek Inc: "Delay-Tolerant Re-Transmission Mechanisms in NR-NTN", 3GPP TSG RAN WG1 Meeting #96bis, R1-1904646, Apr. 8-12, 2019 (From Applicant's IDS) (Year: 2019).*

(Continued)

*Primary Examiner* — Mang Hang Yeung
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, an indication of a scheduling offset associated with a hybrid automatic repeat request (HARQ) acknowledgement (ACK) codebook. The UE may transmit, to the network entity, the HARQ ACK codebook based at least in part on the scheduling offset. Numerous other aspects are described.

30 Claims, 13 Drawing Sheets

(56) References Cited

OTHER PUBLICATIONS

Asia Pacific Telecom: "Discussion on Physical Layer Control Procedures for NTN", 3GPP TSG-RAN WG1 Meeting #98-Bis, R1-1910845, 3rd Generation Partnership Project, Mobile Competence Centre, 650, Route Des Lucioles, F-0692 Sophia-Antipolis, vol. RAN WG1, No. Chongqing, China, Oct. 14, 2019-Oct. 20, 2019, Oct. 5, 2019, 3 Pages, XP051789629, The whole document.
International Search Report and Written Opinion—PCT/US2023/019572—ISA/EPO—Aug. 16, 2023.
Mediatek Inc: "Delay-Tolerant Re-Transmission Mechanisms in NR-NTN", 3GPP TSG RAN WG1 Meeting #96bis, R1-1904646, 3rd Generation Partnership Project, Mobile Competence Centre, 650, Route Des Lucioles, F-06921 Sophia-Ant, vol. RAN WG1, No. Xian, China, Apr. 8, 2019-Apr. 12, 2019, Apr. 7, 2019, XP051699855, 5 Pages, Section 2 Section 4 p. 3, figure 3, The whole document.
Samsung: "On Timing Relationship Enhancements", 3GPP TSG RAN WG1 #104-e, R1-2101244, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051971457, 3 Pages, p. 2, The whole document.

\* cited by examiner

SCHEDULING OFFSET FOR HYBRID AUTOMATIC REPEAT REQUEST ACKNOWLEDGEMENT CODEBOOK

CROSS-REFERENCE TO RELATED APPLICATION

This Patent Application claims priority to U.S. Provisional Patent Application No. 63/363,539, filed on Apr. 25, 2022, entitled "SCHEDULING OFFSET FOR HYBRID AUTOMATIC REPEAT REQUEST ACKNOWLEDGEMENT CODEBOOK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a scheduling offset for a hybrid automatic repeat request acknowledgement codebook.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, an indication of a scheduling offset associated with a hybrid automatic repeat request (HARQ) acknowledgement (ACK) codebook. The method may include transmitting, to the network entity, the HARQ ACK codebook based at least in part on the scheduling offset.

Some aspects described herein relate to a method of wireless communication performed by a network entity. The method may include transmitting, to a UE, an indication of a scheduling offset associated with a HARQ ACK codebook. The method may include receiving, from the UE, the HARQ ACK codebook based at least in part on the scheduling offset.

Some aspects described herein relate to an apparatus for wireless communication at a UE. The apparatus may include a memory and one or more processors coupled to the memory. The one or more processors may be configured to receive, from a network entity, an indication of a scheduling offset associated with a HARQ ACK codebook. The one or more processors may be configured to transmit, to the network entity, the HARQ ACK codebook based at least in part on the scheduling offset.

Some aspects described herein relate to an apparatus for wireless communication associated with a network entity. The apparatus may include a memory and one or more processors coupled to the memory. The one or more processors may be configured to transmit, to a UE, an indication of a scheduling offset associated with a HARQ ACK codebook. The one or more processors may be configured to receive, from the UE, the HARQ ACK codebook based at least in part on the scheduling offset.

Some aspects described herein relate to a non-transitory computer-readable medium that stores a set of instructions for wireless communication by a UE. The set of instructions, when executed by one or more processors of the UE, may cause the UE to receive, from a network entity, an indication of a scheduling offset associated with a HARQ ACK codebook. The set of instructions, when executed by one or more processors of the UE, may cause the UE to transmit, to the network entity, the HARQ ACK codebook based at least in part on the scheduling offset.

Some aspects described herein relate to a non-transitory computer-readable medium that stores a set of instructions for wireless communication by a network entity. The set of instructions, when executed by one or more processors of the network entity, may cause the network entity to transmit, to a UE, an indication of a scheduling offset associated with a HARQ ACK codebook. The set of instructions, when executed by one or more processors of the network entity, may cause the network entity to receive, from the UE, the HARQ ACK codebook based at least in part on the scheduling offset.

Some aspects described herein relate to an apparatus for wireless communication. The apparatus may include means for receiving, from a network entity, an indication of a scheduling offset associated with a HARQ ACK codebook. The apparatus may include means for transmitting, to the network entity, the HARQ ACK codebook based at least in part on the scheduling offset.

Some aspects described herein relate to an apparatus for wireless communication. The apparatus may include means for transmitting, to a UE, an indication of a scheduling offset associated with a HARQ ACK codebook. The apparatus may include means for receiving, from the UE, the HARQ ACK codebook based at least in part on the scheduling offset.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
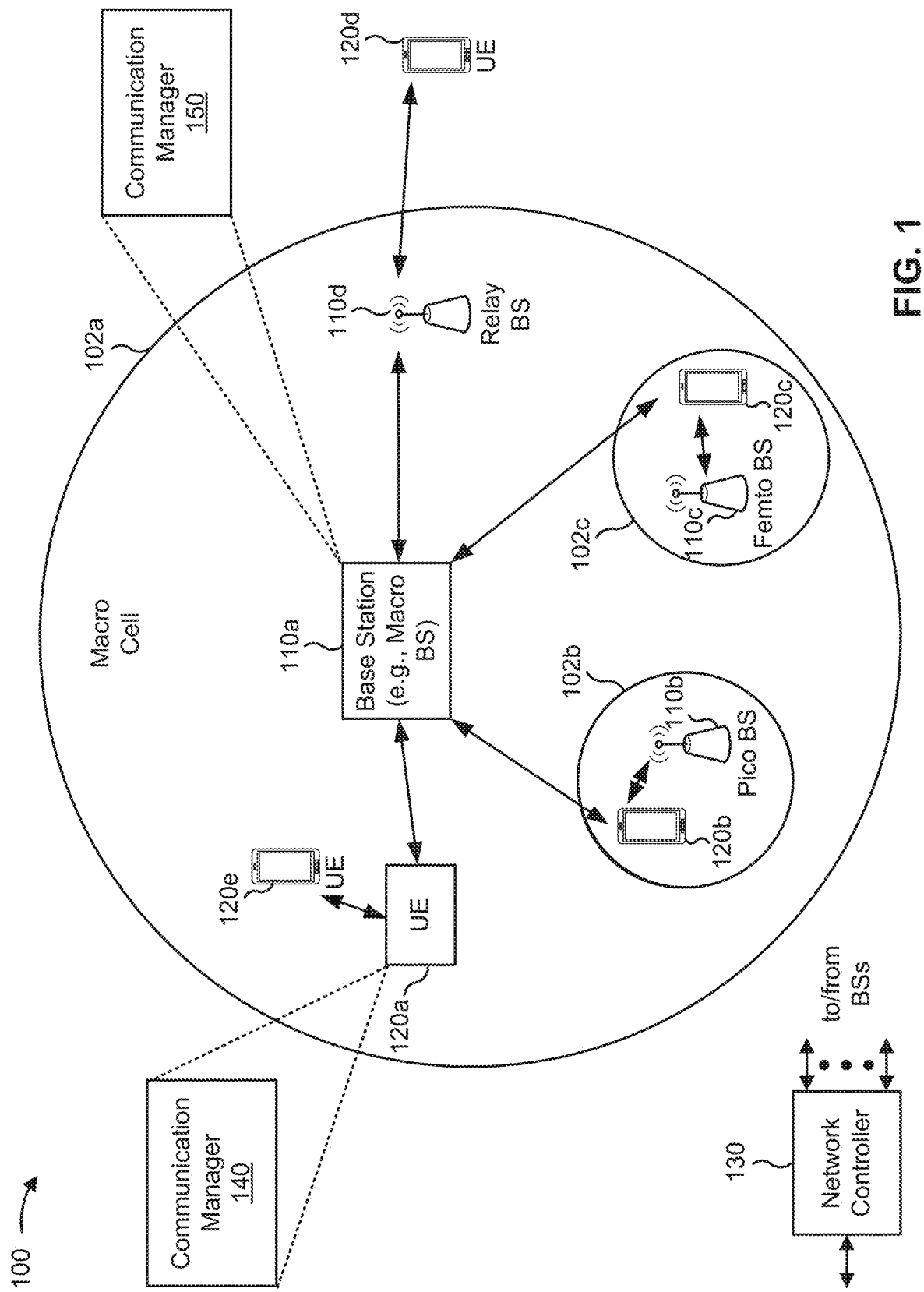
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, an indication of a scheduling offset associated with a hybrid automatic repeat request (HARQ) acknowledgement (ACK) codebook; and transmit, to the network entity, the HARQ ACK codebook based at least in part on the scheduling offset. Additionally, or alternatively, the communication manager 140 may perform one or more other operations described herein.

In some aspects, the network entity described herein may be associated with the base station 110. The network entity may include a communication manager 150. As described in more detail elsewhere herein, the communication manager 150 may transmit, to a UE (e.g., UE 120), an indication of a scheduling offset associated with a HARQ ACK codebook; and receive, from the UE, the HARQ ACK codebook based at least in part on the scheduling offset. Additionally, or alternatively, the communication manager 150 may perform one or more other operations described herein.

As indicated above, FIG. 1 is provided as an example. Other examples may differ from what is described with regard to FIG. 1.

Figure 2:
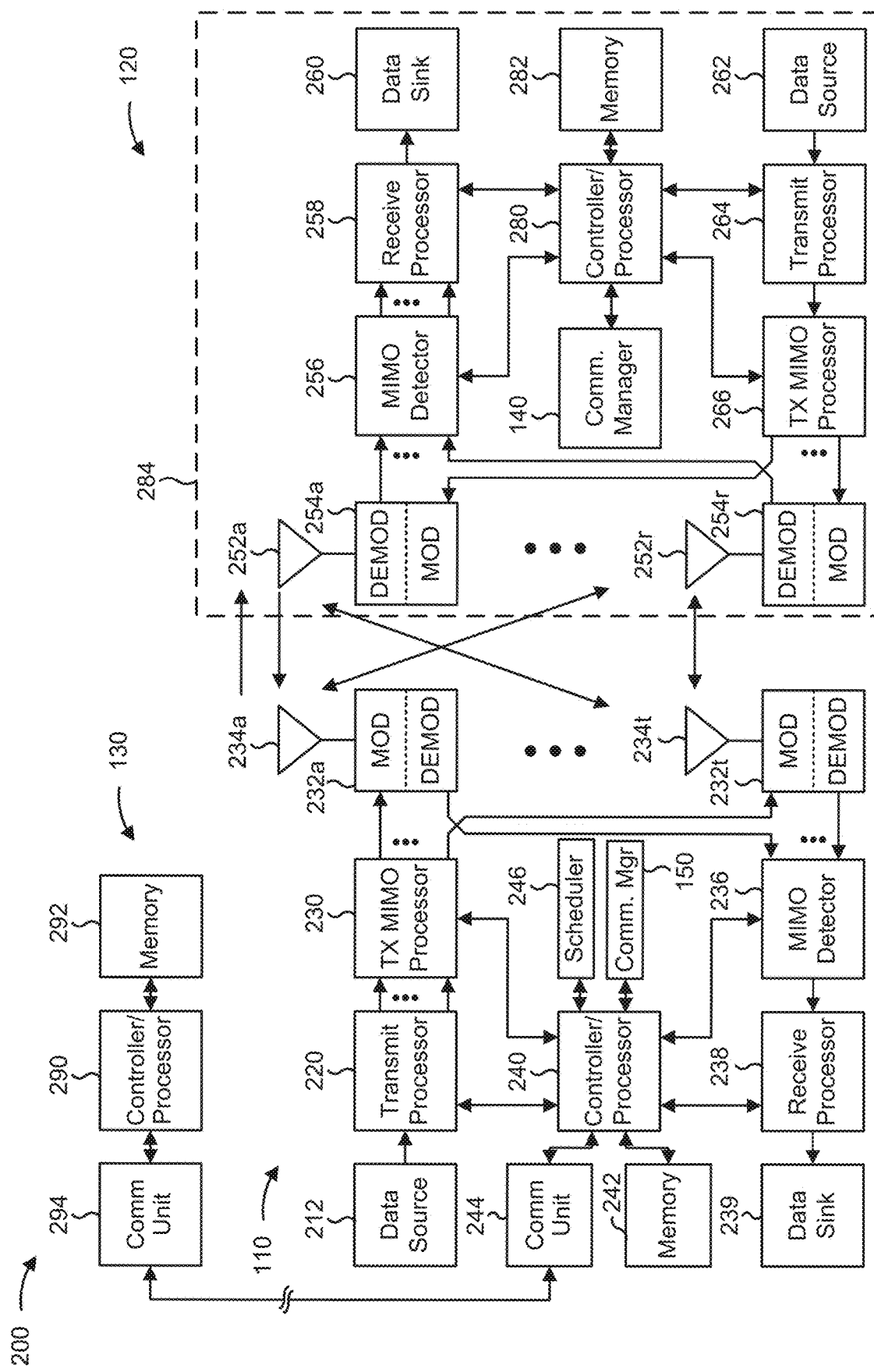
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the base station 110, the controller/processor 280 of the UE 120, and/or any other component(s) of FIG. 2 may perform one or more techniques associated with a scheduling offset for a HARQ ACK codebook, as described in more detail elsewhere herein. In some aspects, the network entity described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving, from a network entity, an indication of a scheduling offset associated with a HARQ ACK codebook; and/or means for transmitting, to the network entity, the HARQ ACK codebook based at least in part on the scheduling offset. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity described elsewhere herein includes means for transmitting, to a UE (e.g., the UE 120), an indication of a scheduling offset associated with a HARQ ACK codebook; and/or means for receiving, from the UE, the HARQ ACK codebook based at least in part on the scheduling offset. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
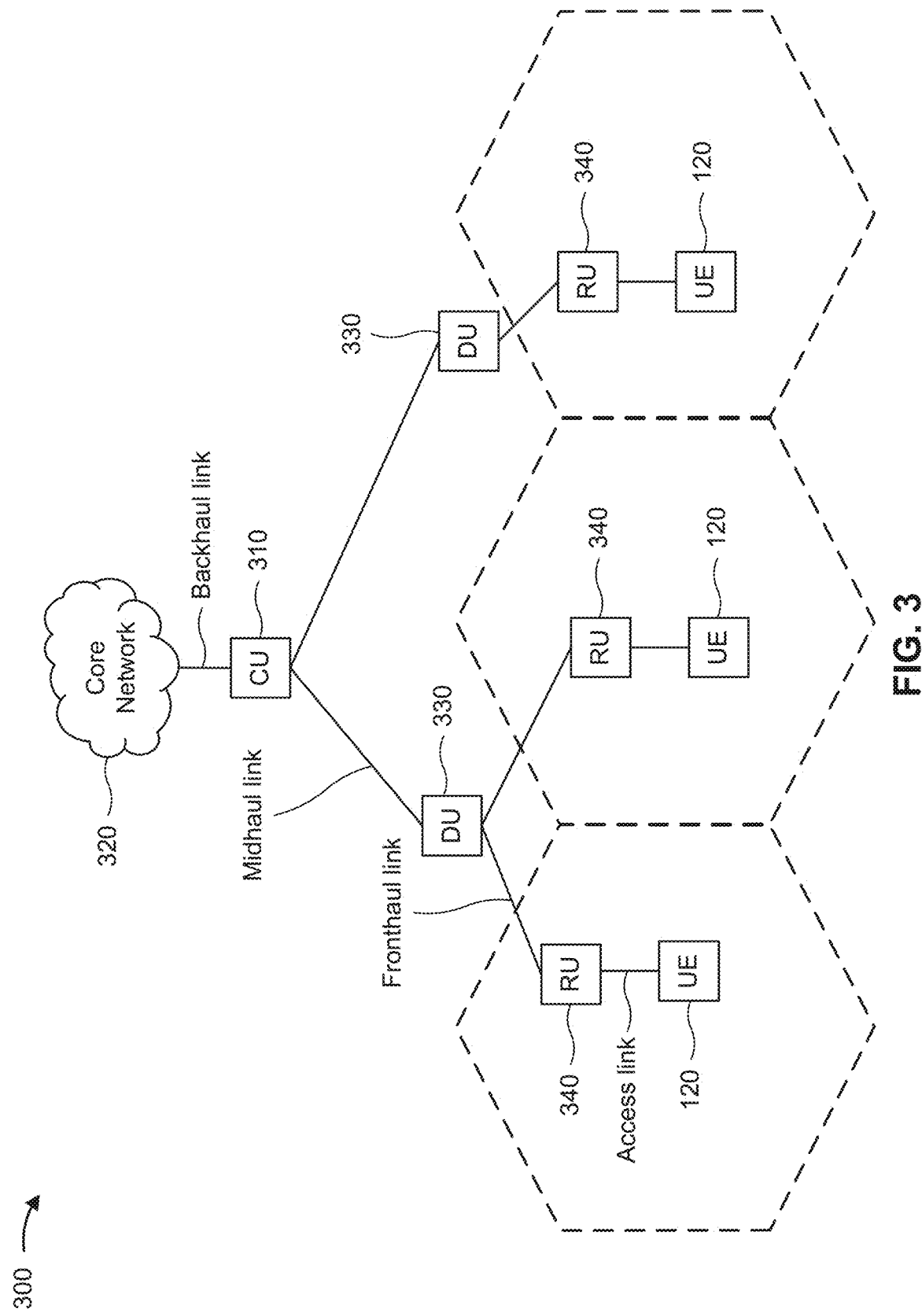
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4A:
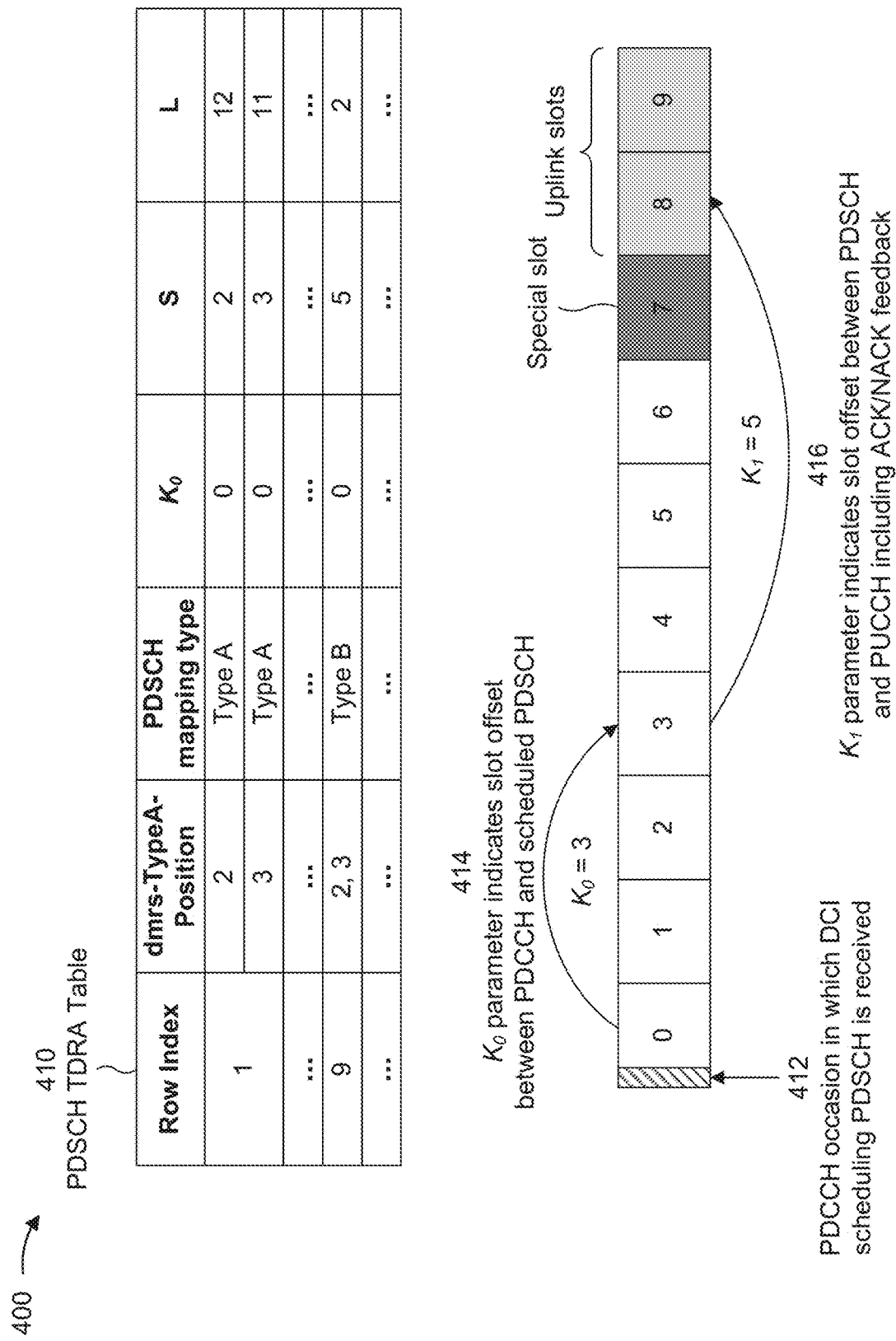
FIGS. 4A-4B are diagrams illustrating examples of time domain resource allocations, in accordance with the present disclosure.
Figure 4B:
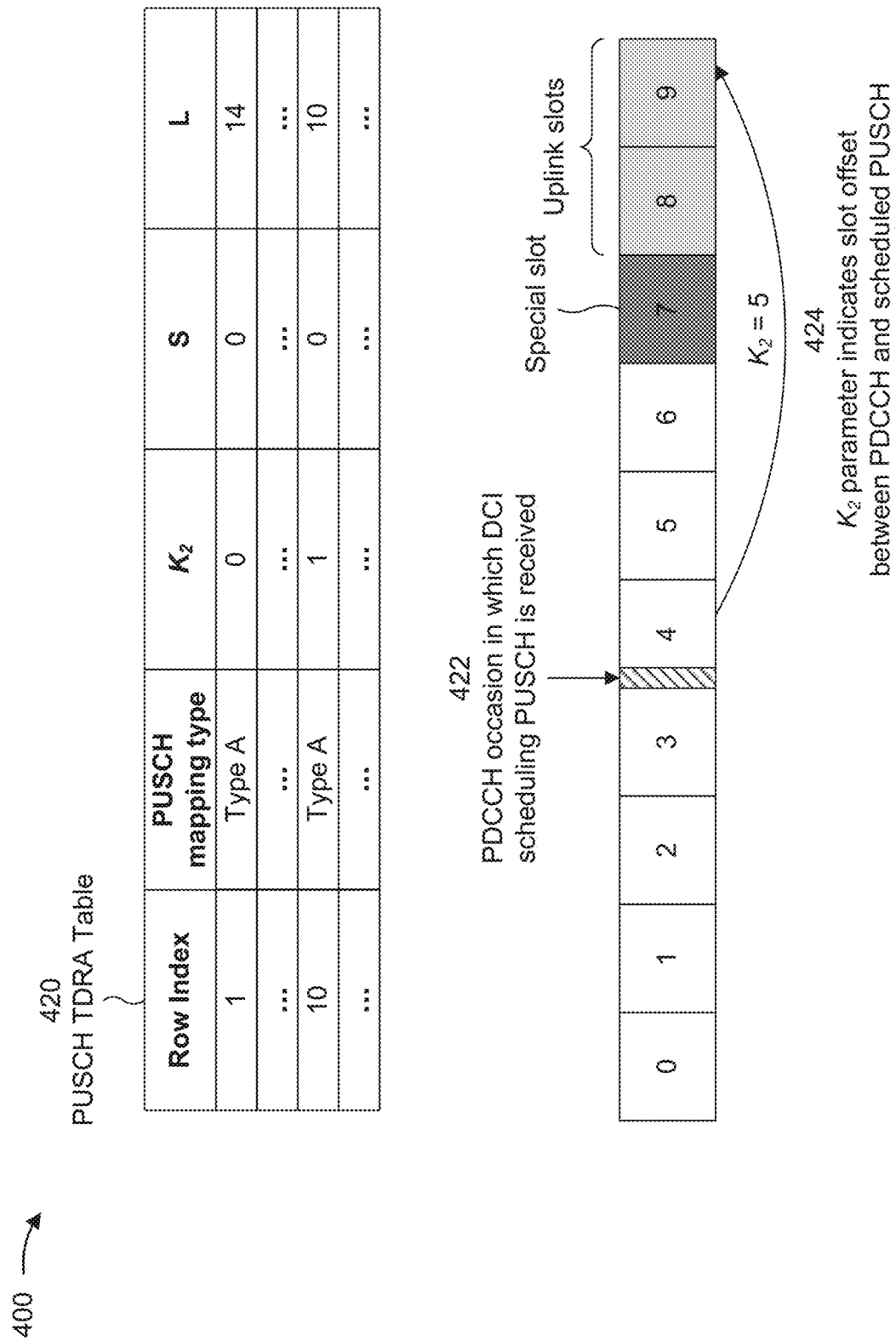

FIGS. 4A-4B are diagrams illustrating examples 400 of time domain resource allocations (TDRAs), in accordance with the present disclosure. FIG. 4A shows an example downlink TDRA table 410 and FIG. 4B shows an example uplink TDRA table 420. The downlink TDRA table 410 may be, for example, a physical downlink shared channel (PDSCH) TDRA table. The uplink TDRA table 420 may be, for example, a physical uplink shared channel (PUSCH) TDRA table. In some aspects, the base station 110 and the UE 120 may use different TDRA tables than those shown in FIGS. 4A-4B, such as for different configurations, different cells, and/or different sub-carrier spacings of cells.

When scheduling a downlink communication or an uplink communication, a base station 110 may transmit a physical downlink control channel (PDCCH) carrying downlink control information (DCI) that indicates a TDRA for the downlink or uplink communication. For example, the DCI may include a TDRA field that includes a TDRA index value. The TDRA index value may indicate a row index of a corresponding TDRA table, and the row index may correspond to a set of TDRA parameters (sometimes referred to as scheduling parameters or scheduling information). The base station 110 and the UE 120 may use the TDRA parameters in the corresponding row index for the downlink or uplink communication scheduled via the DCI. In the examples shown in FIGS. 4A-4B, a TDRA index value of in in the DCI may correspond to a row index of m+1 in the TDRA table. For example, a TDRA index value of 0 may correspond to a row index of 1.

As shown in FIG. 4A, for a downlink communication (e.g., a PDSCH communication), the TDRA parameters may include, for example, a $K_0$ value, an S value, and an L value. The $K_0$ value may represent a timing offset (e.g., in number of slots) between a slot containing the scheduling DCI (carrying a grant that schedules the PDSCH communication) and a slot containing the scheduled PDSCH communication (scheduled via the scheduling DCI). For example, as shown in FIG. 4A, and by reference number 412, a UE may receive DCI scheduling a PDSCH in a PDCCH monitoring occasion of slot number 0, and a value of the $K_0$ parameter may indicate the slot in which the UE can expect to receive the PDSCH scheduled via the DCI. For example, as shown by reference number 414, the UE may expect to receive the PDSCH in slot number 3 based on receiving the scheduling DCI in slot number 0 with the $K_0$ parameter indicating a timing offset of three slots. The S value may represent a starting symbol for the PDSCH communication in the indicated slot. The L value may represent a length (e.g., a number of consecutive symbols) of the PDSCH communication (e.g., in the indicated slot). In some cases, the S value and the L value may collectively be referred to as a start and length indicator value (SLIV). In some aspects, the same row index value may correspond to a different set of TDRA parameters depending on a Type A DMRS position (e.g., a symbol within a resource block that contains the DMRS) and/or a PDSCH mapping type (e.g., indicating a starting symbol of the DMRS, a length of the DMRS, and/or whether slot-based scheduling or mini-slot-based scheduling is used).

Furthermore, in some aspects, a $K_1$ parameter may be used to indicate a timing offset between the PDSCH scheduled via the DCI and a slot in which the UE is to transmit a physical uplink control channel (PUCCH) that carries acknowledgement/negative acknowledgement (ACK/NACK) feedback for the PDSCH, such as HARQ ACK/NACK feedback. For example, as shown by reference number 416, the UE may be expected to receive a PDSCH in slot number 3 based on the value of the $K_0$ parameter, and may transmit a PUCCH that carries ACK/NACK feedback for the PDSCH in slot number 8 based on the $K_1$ parameter indicating a timing offset of five slots from the slot in which the PDSCH is scheduled (e.g., slot number 3 in the illustrated example). In cases where a PDCCH contains a multi-PDSCH grant, the $K_1$ parameter may be counted from the slot in which the last granted PDSCH is scheduled.

As shown in FIG. 4B, for an uplink communication (e.g., a PUSCH communication), the TDRA parameters may include, for example, a $K_2$ value, an S value, and an L value. The $K_2$ value may represent a timing offset (e.g., in number of slots) between a slot containing the scheduling DCI (carrying a grant that schedules the PUSCH communication) and a slot containing the scheduled PUSCH communication (scheduled via the scheduling DCI). For example, as shown in FIG. 4B, and by reference number 422, a UE may receive DCI scheduling a PUSCH in a PDCCH monitoring occasion of slot number 4, and a value of the $K_2$ parameter may indicate the slot in which the UE can expect to receive the PUSCH scheduled via the DCI. For example, as shown in FIG. 4B, and by reference number 424, the UE may expect to receive the PUSCH in slot number 9 based on receiving the scheduling DCI in slot number 4 with the $K_2$ parameter indicating a timing offset of five slots. The S value may represent a starting symbol for the PUSCH communication in the indicated slot. The L value may represent a length (e.g., a number of consecutive symbols) of the PUSCH communication (e.g., in the indicated slot). In some aspects, the same row index value may correspond to a different set of TDRA parameters depending on, for example, a PUSCH mapping type (e.g., indicating a starting symbol of the DMRS, a length of the DMRS, and/or whether slot-based scheduling or mini-slot-based scheduling is used).

Accordingly, various timing offsets may be used in a wireless network to indicate a timing offset between a PDCCH, a PDSCH, a PUCCH, and/or a PUSCH. For example, as described above, a $K_0$ parameter may indicate a timing offset (or slot offset) between a slot in which a PDCCH is received and a slot in which a PDSCH granted by the PDCCH is scheduled, a $K_1$ parameter may indicate a timing offset between the slot in which the PDSCH is scheduled and a slot in which a UE is to transmit ACK/NACK feedback for the PDSCH, and/or a $K_2$ parameter may indicate a timing offset between a slot in which a PDCCH is received and a slot in which a PUSCH granted by the PDCCH is scheduled. In general, the $K_0$, $K_1$, and/or $K_2$ parameters may be determined based on a TDRA field in the scheduling DCI. For example, the TDRA field may have a value that indicates a row index in an RRC-configured TDRA table, and the indicated row index may include a value for the $K_0$, $K_1$, and/or $K_2$ parameter (e.g., depending on whether the DCI schedules a PDSCH and/or a PUSCH). However, in some cases, a UE may receive a PDCCH that schedules a PDSCH and/or a PUSCH before receiving an RRC configuration. In such cases, the UE may determine the value(s) of the $K_0$, $K_1$, and/or $K_2$ parameters from a default set of values indicated in a default TDRA table. For example, in the PDSCH default TDRA table, the $K_0$ parameter may have a value of zero slots or one slot, whereby the PDSCH is either scheduled in the same slot as the PDCCH or the next slot after the PDSCH, and the $K_1$ parameter may have a value in a range from one to eight slots when carrying ACK/NACK feedback for a PDSCH scheduled via fallback DCI (e.g., DCI format 1_0). Alternatively, when a DCI format other than DCI format 1_0 schedules a PDSCH or a semi-persistent scheduling (SPS) release, the $K_1$ parameter may be determined by a PDSCH-to-HARQ feedback timing indicator field in the scheduling DCI, which may map to a value for the $K_1$ parameter that is provided by a configured parameter (e.g., dl-DataToUL-ACK, or dl-DataToUL-ACK-ForDCIForat1_2 for DCI format 1_2) that can have a value in a range from zero to fifteen. Furthermore, in the PUSCH default TDRA table, the $K_2$ parameter may have a value of j, j+1, j+2, or j+3, where j is one for a subcarrier spacing of 15 kilohertz (kHz), one for a subcarrier spacing of 30 kHz, two for a subcarrier spacing of 60 kHz, or three for a subcarrier spacing of 120 kHz.

In some aspects, a HARQ ACK codebook may be used to provide ACK/NACK feedback corresponding to multiple downlink slots (e.g., multiple PDSCHs), and thus the HARQ ACK codebook may be based at least in part on multiple $K_1$ values, each associated with a corresponding downlink slot. Aspects of the HARQ ACK codebook are described in more detail in connection with FIG. 5.

As indicated above, FIGS. 4A-4B are provided as examples. Other examples may differ from what is described with regard to FIGS. 4A-4B.

Figure 5:
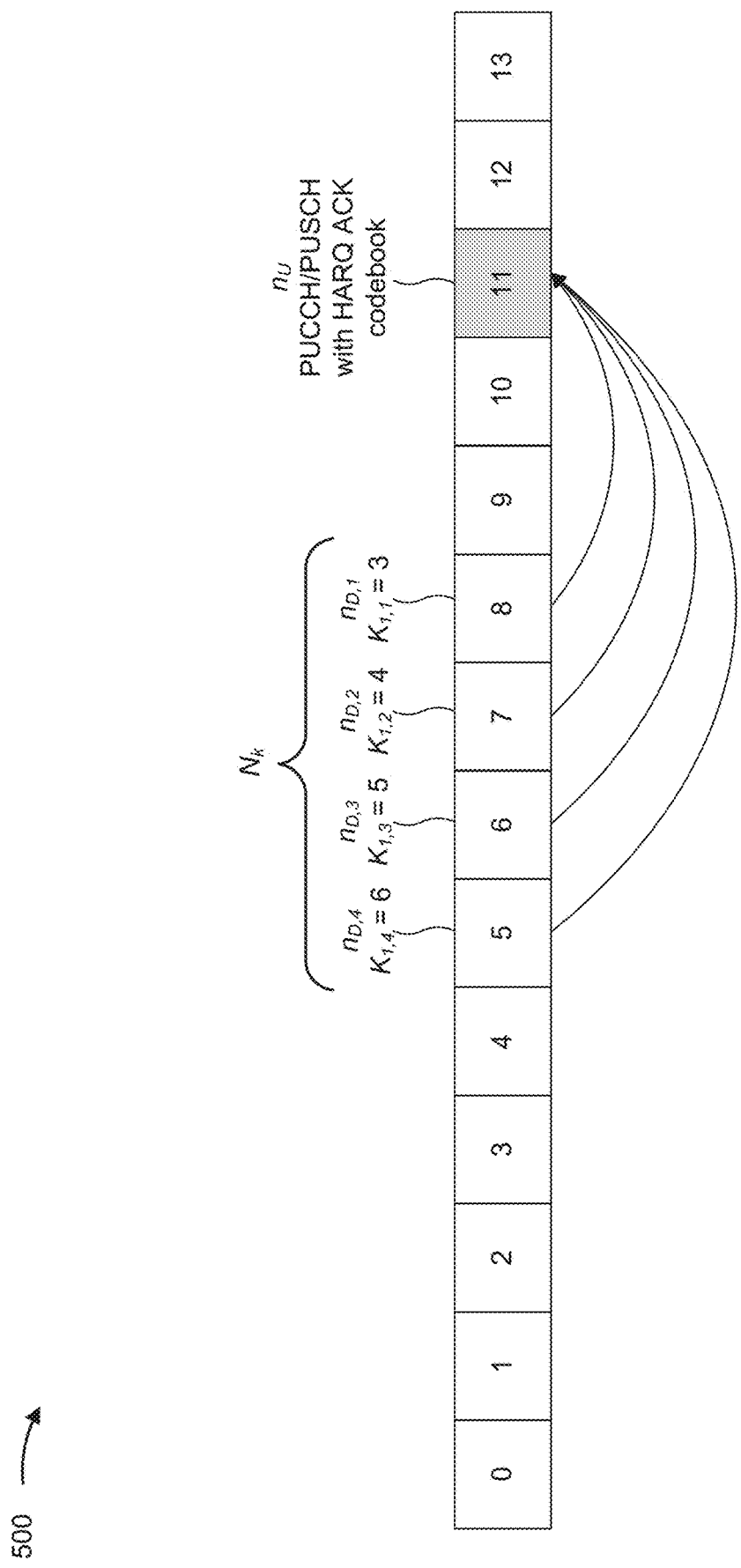
FIG. 5 is a diagram illustrating an example of a hybrid automatic repeat request (HARQ) acknowledgement (ACK) codebook, in accordance with the present disclosure.

FIG. 5 is a diagram illustrating an example 500 of a HARQ ACK codebook, in accordance with the present disclosure.

In some instances, a UE 120 may provide HARQ ACK/NACK feedback to a network entity (e.g., a base station 110, a CU 310, a DU 330, an RU 340, or a similar network entity) for a downlink transmission (e.g., a PDSCH transmission) using a HARQ ACK codebook transmitted in a PUSCH or a PUCCH. A HARQ ACK codebook is a sequence of bits that is constructed using ACK/NACK feedback of multiple downlink receptions (e.g., multiple PDSCH transmissions) during a configured time window. A HARQ ACK codebook may be a type 1 codebook or a type 2 codebook. A type 1 codebook is a fixed size codebook (e.g., has a fixed number of bits) indicated by a network entity via RRC signaling (e.g., a type 1 codebook may be referred to as a semi-static codebook). A total size of a type 1 codebook is equal to the sum of downlink transmission occasions (e.g., PDSCH occasion) for a given time window. The sum of downlink transmission occasions may account for multiple PDSCH transmissions in a single slot, multiple PDSCH transmissions across multiple slots, multiple PDSCH transmissions across component carriers, multiple transport blocks (TBs) for a specific PDSCH transmission, and/or multiple code block groups (CBGs) for each TB. A type 2 codebook has a dynamic size that changes according to resource allocation (e.g., a type 2 codebook may be referred to as a dynamic codebook).

In some cases, a HARQ ACK codebook may thus provide HARQ ACK/NACK feedback corresponding to multiple downlink slots (e.g., multiple PDSCH transmissions). More particularly, a UE 120 may transmit corresponding HARQ ACK/NACK information in a PUCCH or PUSCH in an uplink slot, sometimes referred to as $n_U$, as shown in FIG. 5. Moreover, the HARQ ACK codebook transmitted in slot $n_U$ may contain feedback for a set of downlink slots, with each slot sometimes referred to as $n_{D,k}$. A number of downlink slots (sometimes referred to as $N_K$) for which HARQ ACK/NACK feedback may be provided in the HARQ ACK codebook may be equal to a number of downlink slots overlapping with uplink slot $n_U-K_{1,k}$, where $K_{1,k}$ corresponds to the $K_1$ offset associated with the downlink transmission in the corresponding slot, $n_{D,k}$.

For example, and as shown in FIG. 5, a PUSCH or a PUCCH used to transmit a HARQ ACK codebook may be scheduled in an uplink slot, $n_U$, which in the depicted example is slot 11. In this example, the HARQ ACK codebook includes HARQ ACK/NACK feedback associated with four downlink slots: $n_{D,1}$ (e.g., slot 8), $n_{D,2}$ (e.g., slot 7) $n_{D,3}$ (e.g., slot 6), and $n_{D,4}$ (e.g., slot 5). This is because each corresponding downlink slot (e.g., each of $n_{D,1}$, $n_{D,2}$, $n_{D,3}$, and $n_{D,4}$) overlaps with a corresponding uplink slot $n_U-K_{1,k}$. More particularly, a DCI scheduling a PDSCH transmission in $n_{D,1}$ (e.g., slot 8) may have indicated that a corresponding $K_1$ offset (e.g., $K_{1,1}$) is equal to 3 slots, and thus ACK/NACK feedback for $n_{D,1}$ may be provided in $n_U$ (e.g., slot 11) because $n_{D,1}$ overlaps with uplink slot $n_U-K_{1,k}$ (e.g., uplink slot 11-3=slot 8). Similarly, a DCI scheduling a PDSCH transmission in slots $n_{D,2}$ (e.g., slot 7), $n_{D,3}$ (e.g., slot 6), and $n_{D,4}$ (e.g., slot 5) may have indicated that a corresponding $K_1$ offset (e.g., $K_{1,2}$, $K_{1,3}$, and $K_{1,4}$) is equal to 4 slots, 5 slots, and 6 slots, respectively, and thus ACK/NACK feedback for $n_{D,2}$, $n_{D,3}$, and $n_{D,4}$ may be provided in $n_U$ (e.g., slot 11) because $n_{D,2}$, $n_{D,3}$, and $n_{D,4}$ overlap with uplink slot $n_U-K_{1,k}$ (e.g., uplink slot 11-4=slot 7 for $n_{D,2}$, uplink slot 11-5=slot 6 for $n_{D,3}$, and uplink slot 11-6=slot 5 for $n_{D,4}$). Accordingly, in this example, the HARQ ACK codebook transmitted in $n_U$ (e.g., transmission in the PUSCH or PUCCH in slot 11) may be a sequence of bits constructed using ACK/NACK feedback of downlink receptions received in PDSCH in slots 5, 6, 7, and 8.

In some cases, a UE 120 may receive downlink transmissions from, and thus transmit a HARQ ACK codebook to, a network entity associated with a non-terrestrial network (NTN). In such cases, the above-described HARQ ACK codebook timeline may be inadequate for providing feedback, due to large propagation delays associated with the NTN, or the like. Aspects of the NTN are described in more detail in connection with FIG. 6.

As indicated above, FIG. 5 is provided as an example. Other examples may differ from what is described with regard to FIG. 5.

Figure 6:
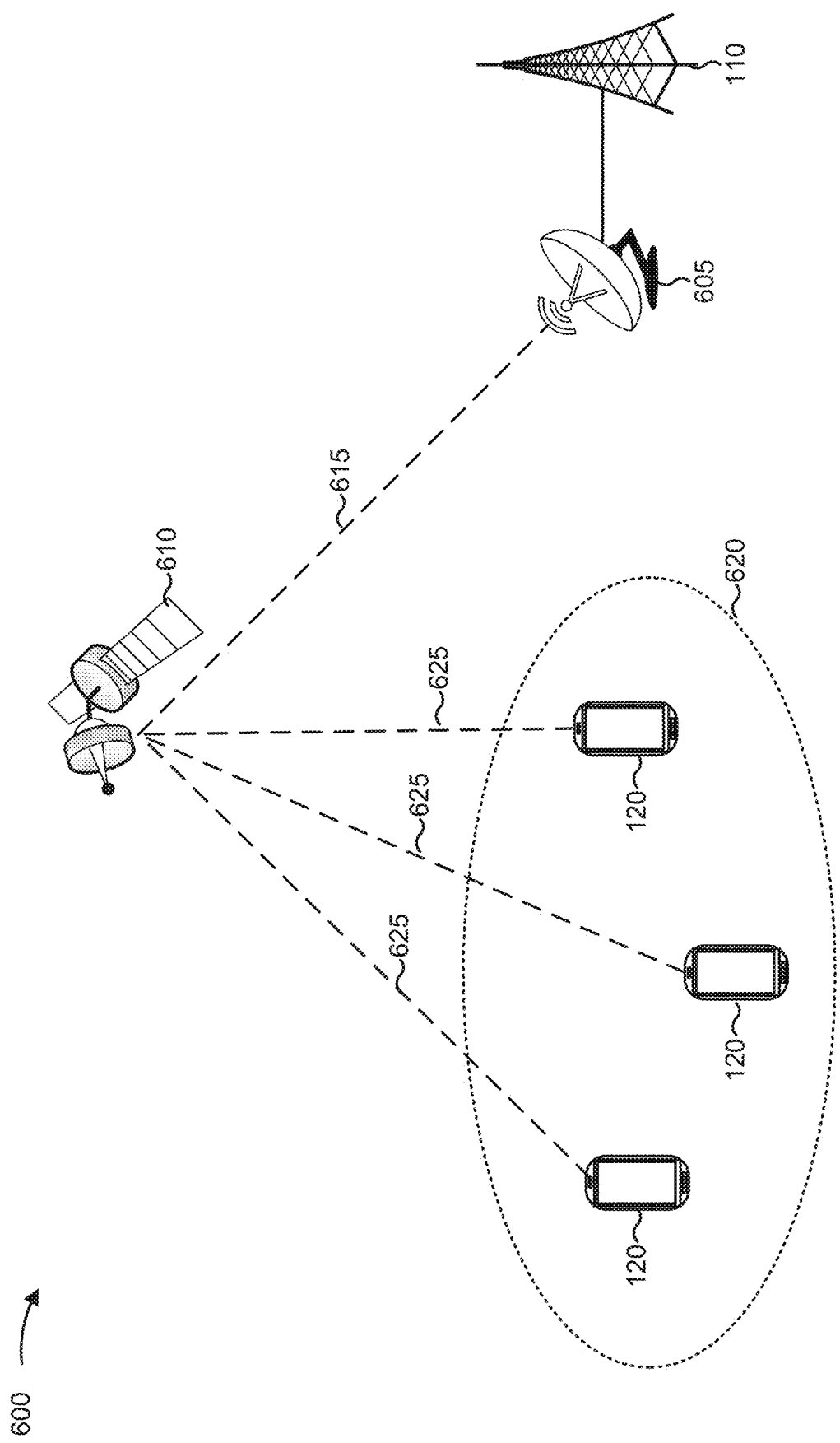
FIG. 6 is a diagram illustrating an example of a non-terrestrial network, in accordance with the present disclosure.

FIG. 6 is a diagram illustrating an example 600 of an NTN, in accordance with the present disclosure.

As shown in FIG. 6, for an NTN, a base station 110 or other network entity (e.g., a CU 310, a DU 330, an RU 340, or a similar network entity) may be in communication with a gateway 605, which may be in communication with a satellite 610 via a feeder link 615. The satellite 610 may provide coverage to one or more UEs 120 in a cell 620 via respective service links 625 (e.g., the satellite 610 may act as a gNB or the like, providing coverage to the UEs 120 in the cell 620). In this regard, communications between the base station 110 or other network component and a UE 120 may be associated with a large round trip time (RTT), such as an RTT of 500 milliseconds (ms) or even more, due to the propagation delay between the base station 110 and the UE 120, via the gateway 605 and the satellite 610.

In such cases, the HARQ ACK codebook timeline described in connection with FIG. 5 may be inadequate for a UE 120 to provide meaningful feedback to the base station 110 or other network entity. More particularly, the uplink slot for providing feedback, $n_U$ (e.g., slot 11), may occur prior to a UE 120 receiving transmissions associated with one or more downlink slots, $n_{D,k}$, due to the propagation delay associated with those transmissions. Accordingly, the UE 120 may not be able to provide a complete HARQ ACK codebook, or else may signal NACK in the HARQ ACK codebook for certain downlink transmissions that safely arrive later-in-time at the UE 120 than the uplink slot, $n_U$. As a result, the UE 120 and/or one or more network entities may consume computing, power, network, and/or communication resources in order to detect and/or correct communication errors, including retransmitting communications that ultimately safely arrive at the UE 120, but after the uplink slot, $n_U$. This may lead to increased latency and decreased throughput, and overall inefficient usage of network resources.

Some techniques and apparatuses described herein enable signaling of a scheduling offset associated with a HARQ ACK codebook. The scheduling offset may indicate an offset, in a number of slots, for transmitting a HARQ ACK codebook, such as a HARQ ACK codebook associated with one or more downlink communications received via an NTN. In some aspects, a UE (e.g., UE 120) may transmit the HARQ ACK codebook based at least in part on the scheduling offset, and, in some aspects, further based at least in part on a feedback channel offset value, such as a $K_1$ offset value. In this regard, the HARQ ACK codebook may include a number of HARQ ACK information bits, with each HARQ ACK information bit indicating feedback corresponding to a downlink slot that overlaps with another uplink slot preceding the HARQ ACK slot by a number of slots equal to a sum of the scheduling offset and the feedback channel offset. As a result of the UE transmitting the HARQ ACK codebook based at least in part on the scheduling offset, the UE and/or one or more network entities may conserve computing, power, network, and/or communication resources that may have otherwise been consumed transmitting a HARQ ACK codebook without consideration of the scheduling offset. For example, based at least in part on UE transmitting the HARQ ACK codebook based at least in part on the scheduling offset, the UE and the one or more network entities may communicate with a reduced error rate, which may conserve computing, power, network, and/or communication resources that may have otherwise been consumed to detect and/or correct communication errors. As a result, aspects of the disclosure may result in decreased latency and increased throughput, and overall efficient usage of network resources.

As indicated above, FIG. 6 is provided as an example. Other examples may differ from what is described with regard to FIG. 6.

Figure 7:
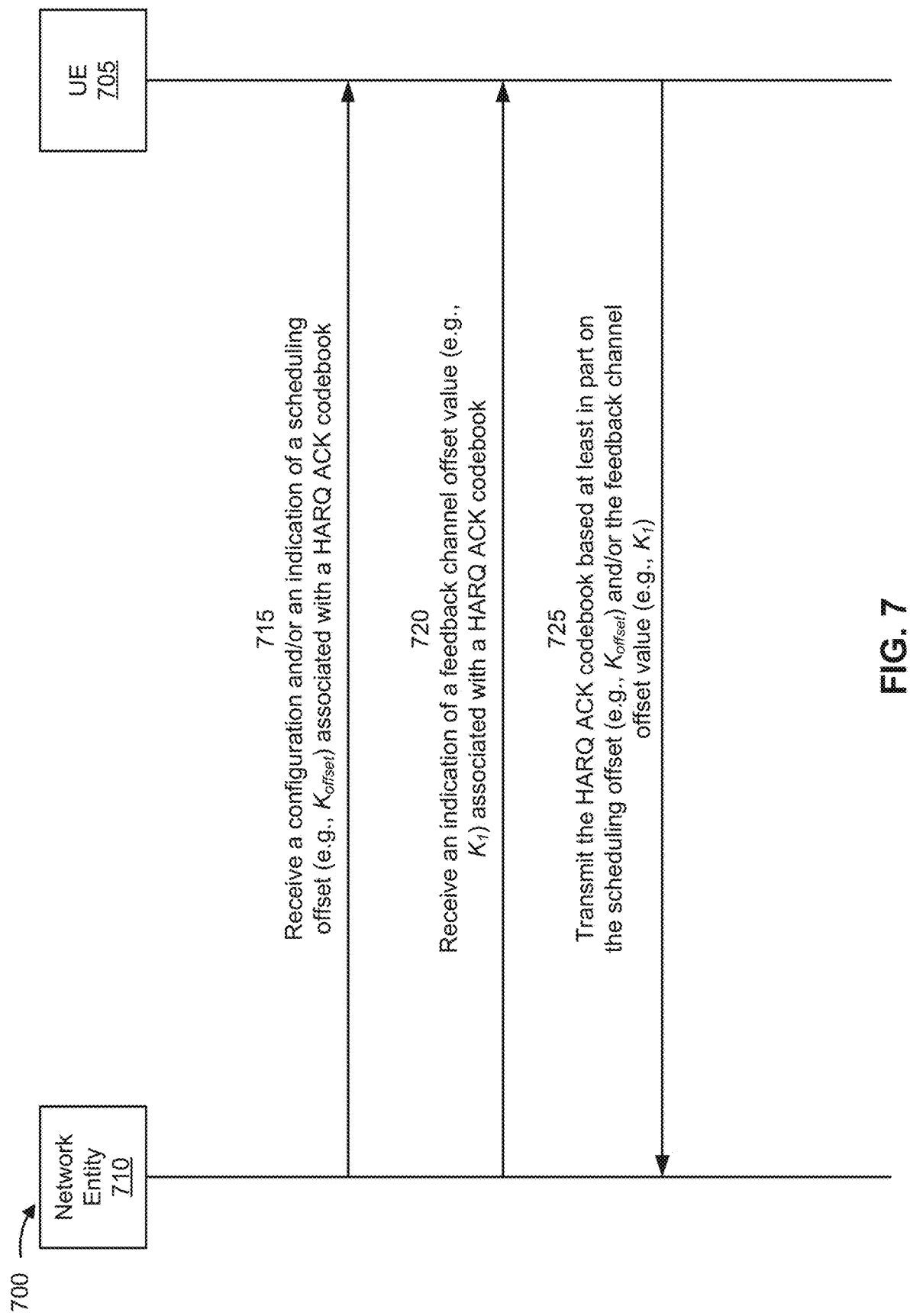
FIG. 7 is a diagram of an example associated with a scheduling offset for a HARQ ACK codebook, in accordance with the present disclosure.

FIG. 7 is a diagram of an example 700 associated with a scheduling offset for a HARQ ACK codebook, in accordance with the present disclosure. As shown in FIG. 7, a UE 705 (e.g., UE 120) may communicate with a network entity 710 (e.g., a base station 110, a CU 310, a DU 330, an RU 340, a satellite 610, and/or a similar network entity). In some aspects, the UE 705 and the network entity 710 may be part of a wireless network, such as the wireless network 100 described in connection with FIG. 1 and/or the NTN described in connection with FIG. 6. The UE 705 and the network entity 710 may have established a wireless connection prior to operations shown in FIG. 7.

As shown by reference number 715, the UE 705 may receive, from the network entity 710, configuration information. In some aspects, the UE 705 may receive the configuration information via one or more of RRC signaling, one or more MAC control elements (MAC-CEs), and/or DCI, among other examples. In some aspects, the configuration information may include an indication of one or more configuration parameters (e.g., already known to the UE 705 and/or previously indicated by the network entity 710 or other network entity) for selection by the UE 705, and/or explicit configuration information for the UE 705 to use to configure the UE 705, among other examples.

In some aspects, the configuration information may configure the UE 705 to use a scheduling offset for transmitting a HARQ ACK codebook. For example, the configuration information may indicate that HARQ ACK information bits in the HARK ACK codebook should indicate ACK/NACK feedback for downlink slots (e.g., $n_{D,k}$) that precede an uplink slot (e.g., $n_U$) by a sum of a feedback channel offset value ($K_{1,k}$) and the scheduling offset, sometimes referred to as $K_{sch\_offset}$ (which, in some aspects, may be equal to $2^\mu * K_{offset}$, where $\mu$ is a numerology used for transmission, e.g., $\mu$ stands for a subcarrier spacing of $2^\mu * 15$ kHz, and $K_{offset}$ is a parameter signaled to the UE 705 by the network entity 710, as described in more detail below). In that regard, in the communication indicated by reference number 715, the UE 705 may receive, from the network entity 710, an indication of the scheduling offset (e.g., $K_{sch\_offset}$ and/or $K_{offset}$) associated with a HARQ ACK codebook. As described in more detail in connection with FIG. 8 below, the scheduling offset may indicate an offset, in a number of slots, associated with transmission of the HARQ ACK codebook with respect to a downlink slot containing a corresponding downlink data transmission (e.g., a PDSCH). Additionally, or alternatively, in some aspects the UE 120 may identify an offset, in a number of slots, associated with transmission of the HARQ ACK codebook with respect to a downlink slot containing a corresponding downlink data transmission (e.g., a PDSCH) using an expression (e.g., $2^\mu * K_{offset}$) that is based at least in part on a scheduling offset parameter signaled to the UE 705 by the network entity 710 (e.g., $K_{offset}$) and a numerology used for transmission (e.g., $\mu$), which is described in more detail below.

In some aspects, the network entity 710 may configure the UE 705 with at least one of a cell-specific offset (sometimes referred to as $K_{cell,offset}$) or a UE-specific offset (sometimes referred to as $K_{UE,offset}$). A cell-specific offset may be a scheduling offset that is applicable to each UE within a given cell, such as the cell 620 described in connection with FIG. 6. In that regard, the satellite 610 may configure each UE 120 within the cell 620 with the cell-specific offset. A UE-specific offset may be a scheduling offset that is applicable only to one or more UEs receiving the UE-specific offset and/or one or more UEs indicated to be associated with the UE-specific offset. For example, in the arrangement shown in FIG. 6, the satellite 610 may configure a first UE 120 of the three UEs 120 with a first UE-specific offset, the satellite 610 may configure a second UE 120 of the three UEs 120 with a second UE-specific offset, and/or the satellite 610 may configure a third UE 120 of the three UEs 120 with a third UE-specific offset.

Accordingly, in some aspects, the scheduling offset indicated by the message shown at reference number 715 may be the cell-specific offset and/or the UE-specific offset described above, or else may be a zero value. For example, the network entity 710 may indicate the cell-specific offset using a system information block (SIB) broadcast, such as via a cellspecificKoffset information element of a SIB broadcast. Additionally, or alternatively, the network entity 710 may indicate the UE-specific offset using at least one of a MAC-CE message or an RRC message. When the scheduling offset is a zero value, the network entity 710 may explicitly indicate the zero value by at least one of a MAC-CE message or an RRC message, or the network entity 710 may implicitly indicate the zero value by an absence of signaling of an offset value (e.g., absence of signaling of a cell-specific offset and a UE-specific offset).

The UE 705 may configure itself based at least in part on the configuration information. In some aspects, the UE 705 may be configured to perform one or more operations described herein based at least in part on the configuration information. For example, when the configuration information configures a scheduling offset (e.g., $K_{sch\_offset}$, $K_{offset}$, $K_{cell,offset}$, and/or $K_{UE,offset}$), the UE 705 may be configured to transmit, to the network entity 710, the HARQ ACK codebook based at least in part on the scheduling offset. Additionally, or alternatively, if the UE 705 is configured to use one of a cell-specific offset or a UE-specific offset, the UE 705 may be configured to transmit, to the network entity 710, the HARQ ACK codebook based at least in part on the one of the cell-specific offset or the UE-specific offset. In some aspects, the UE 705 may be configured with only the cell-specific offset, and thus the UE 705 may be configured to transmit the HARQ ACK codebook based at least in part on the cell-specific offset. In some other aspects, the UE 705 may be configured with only the UE-specific offset, and thus the UE 705 may be configured to transmit the HARQ ACK codebook based at least in part on the UE-specific offset. In some other aspects, the UE 705 may be configured with both the cell-specific offset and the UE-specific offset, and thus the UE 705 may be configured to transmit the HARQ ACK codebook based at least in part on one of the cell-specific offset or the UE-specific offset. For example, in some aspects, when the configuration information configures both the cell-specific offset and the UE-specific offset, the UE 705 may transmit the HARQ ACK codebook based at least in part on the UE-specific offset.

Moreover, in some aspects, the UE 705 may transmit the HARQ ACK codebook further based at least in part on a feedback channel offset value (e.g., a $K_1$ offset or $K_{1,k}$ value, as described in connection with FIGS. 4A and 5). In such aspects, and as shown by reference number 720, the UE 705 may receive, from the network entity 710, an indication of the feedback channel offset value associated with the HARQ ACK codebook. For example, in some aspects, the UE 705 may receive the indication of the feedback channel offset value in DCI scheduling a downlink communication (e.g., a PDSCH) associated with a downlink slot corresponding to the feedback channel offset value. Aspects of the feedback channel offset value are described in more detail in connection with FIG. 8.

As shown at reference number 725, in some aspects, the UE 705 may transmit, to the network entity 710, the HARQ ACK codebook based at least in part on the scheduling offset (e.g., $K_{sch\_offset}$, $K_{offset}$, $K_{cell,offset}$, and/or $K_{UE,offset}$). In some aspects, the HARQ ACK codebook may be transmitted in one of a PUSCH or a PUCCH.

Moreover, in aspects in which the UE 705 received an indication of a feedback channel offset value (e.g., a $K_1$ offset or $K_{1,k}$ value), the transmission may be further based at least in part on the feedback channel offset value (e.g., the UE 705 may transmit, to the network entity 710, the HARQ ACK codebook based at least in part on the scheduling offset and the feedback channel offset value). More particularly, in some aspects, the HARQ ACK codebook may be transmitted in an uplink slot (e.g., $n_U$), the feedback channel offset value (e.g., $K_{1,k}$) may be associated with a downlink slot (e.g., $n_{D,k}$), and a HARQ ACK information bit associated with the HARQ ACK codebook may indicate feedback corresponding to the downlink slot. In such aspects, the downlink slot (e.g., $n_{D,k}$) may overlap with another uplink slot that precedes the uplink slot (e.g., $n_U$) by a number of slots equal to a sum of the scheduling offset (e.g., $K_{sch\_offset}$) and the feedback channel offset (e.g., $K_{1,k}$). That is, a HARQ ACK information bit in a HARQ ACK codebook may indicate feedback for a downlink communication transmitted in a slot ($n_{D,k}$) that overlaps with an uplink slot located at $n_U - (K_{sch\_offset} + K_{1,k})$ (or, put a different way, $n_U - K_{sch\_offset} - K_{1,k}$ and/or $n_U - 2^\mu \times K_{offset} - K_{1,k}$). In some aspects, the UE 705 may transmit the HARQ ACK codebook based at least in part on an expression associated with the scheduling offset and a feedback channel offset value, and, in some aspects, the expression may be equal to $K_{sch\_offset} + K_{1,k}$.

The HARQ ACK codebook may be one of a type 1 codebook (e.g., a semi-static codebook), or a type 2 codebook (e.g., a dynamic codebook). For example, in some aspects, the downlink slot (e.g., $n_{D,k}$) may be associated with an occasion for a candidate PDSCH reception, may be associated with a semi-persistent PDSCH release, and/or may be associated with a transmission configuration indicator (TCI) state update. In such aspects, the HARQ ACK codebook may be a type 1 codebook. In some other aspects, the downlink slot (e.g., $n_{D,k}$) may be associated with a monitoring occasion corresponding to a PDCCH associated with a DCI format scheduling a PDSCH reception, or may be associated with a monitoring occasion corresponding to a PDCCH associated with a DCI format that does not schedule a PDSCH reception but that is nonetheless associated with HARQ ACK information. In such aspects, the HARQ ACK codebook may be a type 2 codebook.

In some other aspects, the scheduling offset (e.g., $K_{sch\_offset}$) may be based at least in part on a signaled value. For example, in some aspects, the network entity 710 may transmit a signaled offset value (sometimes referred to as $K_{offset}$), and the UE 705 may determine the scheduling offset based at least in part on the signaled offset value. In some aspects, the scheduling offset (e.g., $K_{sch\_offset}$) may be based at least in part on a product of the signaled offset value (e.g., $K_{offset}$) and a subcarrier spacing scaling factor. Moreover, in some aspects, the subcarrier spacing scaling factor may be based at least in part on a numerology used for transmission of the HARQ ACK codebook, sometimes referred to as $\mu_{UL}$ or simply $\mu$ for ease of discussion. In some aspects, $\mu_{UL}$ may correspond to an uplink subcarrier spacing (SCS) of $15 * 2^{\mu UL}$ kHz. Put another way, $\mu_{UL}$ may be equal to 0, 1, 2, 3, or 4 for SCSs of 15 kHz, 30 kHz, 60 kHz, 120 kHz, or 240 kHz, respectively. In some aspects, the subcarrier spacing scaling factor is equal to two to a power of the numerology used for transmission of the HARQ ACK codebook (e.g., $2^{\mu UL}$). Thus, in such aspects, $K_{sch\_offset} = 2^{\mu UL} * K_{offset}$. Aspects of transmitting the HARQ ACK codebook based at least in part on the scheduling offset are described in more detail in connection with FIG. 8.

As indicated above, FIG. 7 is provided as an example. Other examples may differ from what is described with respect to FIG. 7.

Figure 8:
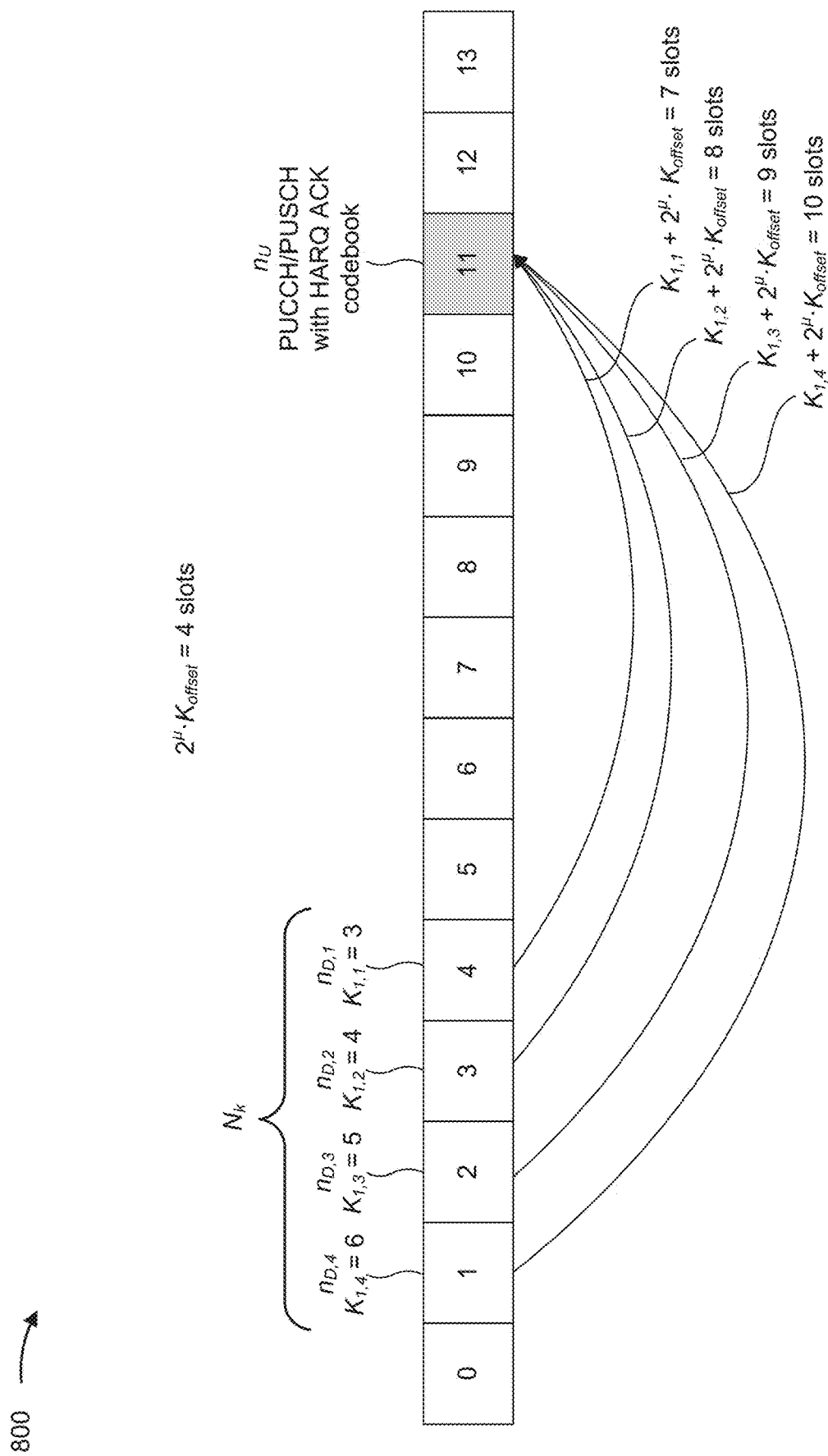
FIG. 8 is a diagram of an example associated with a scheduling offset for a HARQ ACK codebook, in accordance with the present disclosure.

FIG. 8 is a diagram illustrating an example 800 of a scheduling offset for a HARQ ACK codebook, in accordance with the present disclosure.

In this aspect shown in FIG. 8, a UE (e.g., UE 705) may be configured to transmit a HARQ ACK codebook in an uplink slot (e.g., $n_U$), which, in the depicted example, is slot 11. More particularly, the UE may be configured to transmit the HARQ ACK codebook in a PUSCH and/or a PUCCH associated with slot 11. In this example, the UE has been configured with a scheduling offset (e.g., $K_{sch\_offset}$ and/or $K_{offset}$). More particularly, the UE may have received an indication from a network entity (e.g., network entity 710) that the HARQ ACK codebook should be transmitted based at least in part on the scheduling offset (e.g., $K_{sch\_offset}$ and/or $2^\mu * K_{offset}$), which, in the depicted example, is 4 slots. As described above, in some aspects the scheduling offset may account for a propagation delay associated with an NTN, or the like. Moreover, the scheduling offset may be a cell-specific offset or a UE-specific offset, as described in connection with FIG. 7. The scheduling offset may further be based at least in part on a signaled offset (e.g., $K_{offset}$), as described in connection with FIG. 7. For example, in some aspects, the scheduling offset may be equal to $2^{\mu UL} * K_{offset}$.

In such aspects, for an uplink control information (UCI) carrying the HARQ ACK codebook in the uplink slot (e.g., $n_U$), a HARQ ACK information bit may correspond to a downlink slot (e.g., $n_{D,k}$) that overlaps an uplink slot with slot index $n_U - K_{1,k} - 2^{\mu UL} * K_{offset}$ (e.g., $n_U - (K_{1,k} 2^{\mu UL} * K_{offset})$), where $K_{1,k}$ is the PDSCH-to-HARQ feedback timing parameter for the downlink slot (e.g., $n_{D,k}$). In the example shown in FIG. 8, this corresponds to a set of downlink slots (e.g., $N_k$) including $n_{D,1}$ (e.g., slot 4), $n_{D,2}$ (e.g., slot 3), $n_{D,3}$ (e.g., slot 2), and $n_{D,4}$ (e.g., slot 1). More particularly, nod may be associated with a $K_1$ offset (e.g., $K_{1,1}$) of 3 slots, and thus the UE may provide HARQ ACK/NACK feedback for $n_{D,1}$ in the HARQ ACK codebook because $n_{D,1}$ precedes $n_U$ by 7 slots (e.g., $K_{1,1}$ (3 slots) + $2^{\mu UL} * K_{offset}$ (4 slots)). Similarly, $n_{D,2}$, $n_{D,3}$, and $n_{D,4}$ may be associated with $K_1$ offsets (e.g., $K_{1,2}$, $K_{1,3}$, and $K_{1,4}$) of 4 slots, 5 slots, and 6 slots, and thus the UE may provide HARQ ACK/NACK feedback for $n_{D,2}$, $n_{D,3}$, and $n_{D,4}$ in the HARQ ACK codebook because $n_{D,2}$, $n_{D,3}$, and $n_{D,4}$ precede $n_U$ by 8 slots, 9 slots, and 10 slots, respectively. Thus, in the depicted example, the HARQ ACK codebook may include a sequence of bits that is constructed using ACK/NACK feedback of $n_{D,1}$, $n_{D,2}$, $n_{D,3}$, and $n_{D,4}$.

More broadly, in some aspects, a UE may be permitted to transmit corresponding HARQ ACK information in a PUCCH or PUSCH in slot $n_U$. In such aspects, if mod $(n_U - 2^{\mu UL} K_{offset} - K_{1,k} + 1, \max(2^{\mu UL - \mu DL}, 1)) = 0$ (with $\mu_{UL}$, corresponding to the numerology used for the uplink and $\mu_{DL}$ corresponding to the numerology used for the downlink), or if a PUCCH length parameter (sometimes referred to as subslotLengthForPUCCH) is provided for the HARQ ACK codebook, $n_D$ may be set to 0-index of a downlink slot overlapping with an uplink slot, and $N_k$ may be set to a number of downlink slots overlapping with uplink slot $n_U - 2^{\mu UL} K_{offset} - K_{1,k}$ if subslotLengthForPUCCH is provided for the HARQ ACK codebook (otherwise, $N_k$ may be equal to $\max(2^{\mu UL - \mu DL}, 1)$).

Put another way, in some aspects, a UE may be permitted to transmit corresponding HARQ ACK information in a PUCCH or PUSCH in slot $n_U + 2^{\mu UL} K_{offset}$. In such aspects, if mod $(n_U - K_{1,k} + 1, \max(2^{\mu UL - \mu DL}, 1)) = 0$, or if a PUCCH length parameter (e.g., subslotLengthForPUCCH) is provided for the HARQ ACK codebook, then $n_D$ may be set to 0-index of a downlink slot overlapping with an uplink slot, and $N_k$ may be set to a number of downlink slots overlapping with uplink slot $n_U - K_{1,k}$ if subslotLengthForPUCCH is provided for the HARQ ACK codebook (otherwise, $N_k$ may be equal to $\max(2^{\mu UL - \mu DL}, 1)$).

As indicated above, FIG. 8 is provided as an example. Other examples may differ from what is described with regard to FIG. 8.

Figure 9:
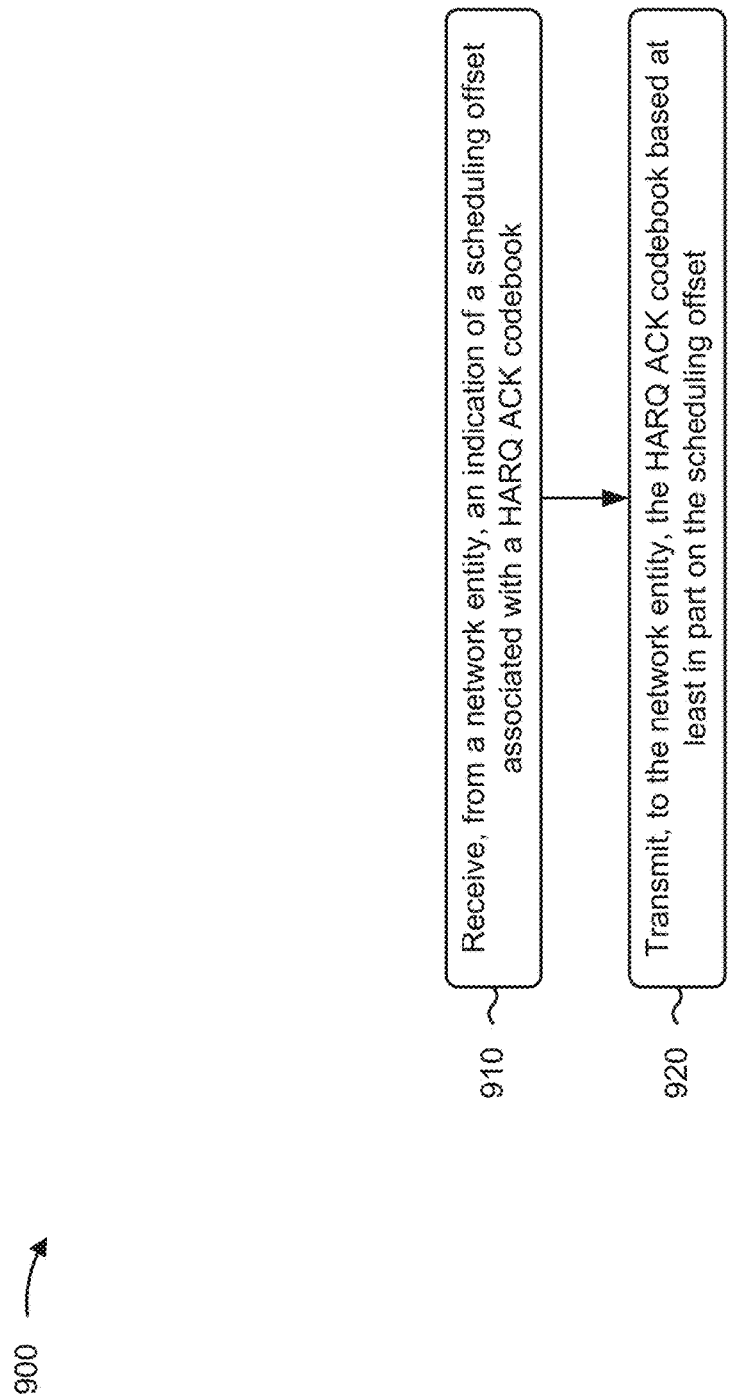
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 705) performs operations associated with a scheduling offset for a HARQ ACK codebook.

As shown in FIG. 9, in some aspects, process 900 may include receiving, from a network entity, an indication of a scheduling offset associated with a HARQ ACK codebook (block 910). For example, the UE (e.g., using communication manager 1108 and/or reception component 1202, depicted in FIG. 12) may receive, from a network entity, an indication of a scheduling offset associated with a HARQ ACK codebook, as described above.

As further shown in FIG. 9, in some aspects, process 900 may include transmitting, to the network entity, the HARQ ACK codebook based at least in part on the scheduling offset (block 920). For example, the UE (e.g., using communication manager 1108 and/or transmission component 1104, depicted in FIG. 11) may transmit, to the network entity, the HARQ ACK codebook based at least in part on the scheduling offset, as described above.

Process 900 may include additional aspects, such as any single aspect or any combination of aspects described below and/or in connection with one or more other processes described elsewhere herein.

In a first aspect, process 900 includes receiving, from the network entity, an indication of a feedback channel offset value associated with the HARQ ACK codebook, wherein transmitting the HARQ ACK codebook is further based at least in part on the feedback channel offset value.

In a second aspect, alone or in combination with the first aspect, the HARQ ACK codebook is transmitted in an uplink slot, the feedback channel offset value is associated with a downlink slot, and a HARQ ACK information bit associated with the HARQ ACK codebook indicates feedback corresponding to the downlink slot.

In a third aspect, alone or in combination with one or more of the first and second aspects, the downlink slot overlaps with another uplink slot, and the other uplink slot precedes the uplink slot by a number of slots equal to a sum of the scheduling offset and the feedback channel offset value.

In a fourth aspect, alone or in combination with one or more of the first through third aspects, the downlink slot is associated with at least one of an occasion for a candidate PDSCH reception, a semi-persistent PDSCH release, or a transmission configuration indicator state update.

In a fifth aspect, alone or in combination with one or more of the first through fourth aspects, the HARQ ACK codebook is a type 1 codebook.

In a sixth aspect, alone or in combination with one or more of the first through fifth aspects, the downlink slot is associated with a monitoring occasion corresponding to at least one of a PDCCH associated with a DCI format scheduling a PDSCH reception, or a PDCCH associated with a DCI format that does not schedule a PDSCH reception and is associated with HARQ ACK information.

In a seventh aspect, alone or in combination with one or more of the first through sixth aspects, the HARQ ACK codebook is a type 2 codebook.

In an eighth aspect, alone or in combination with one or more of the first through seventh aspects, the scheduling offset is based at least in part on a signaled offset value received from the network entity.

In a ninth aspect, alone or in combination with one or more of the first through eighth aspects, the scheduling offset is based at least in part on a product of the signaled offset value and a subcarrier spacing scaling factor.

In a tenth aspect, alone or in combination with one or more of the first through ninth aspects, the subcarrier spacing scaling factor is based at least in part on a numerology used for transmission of the HARQ ACK codebook.

In an eleventh aspect, alone or in combination with one or more of the first through tenth aspects, the subcarrier spacing scaling factor is based at least in part on two to a power of the numerology used for transmission of the HARQ ACK codebook.

In a twelfth aspect, alone or in combination with one or more of the first through eleventh aspects, transmitting the HARQ ACK codebook is based at least in part on an expression associated with the scheduling offset and a feedback channel offset value.

In a thirteenth aspect, alone or in combination with one or more of the first through twelfth aspects, the scheduling offset is one of a cell-specific offset, a UE-specific offset, or a zero value.

In a fourteenth aspect, alone or in combination with one or more of the first through thirteenth aspects, process 900 includes receiving, from the network entity, a configuration configuring only the cell-specific offset, wherein transmitting the HARQ ACK codebook is based at least in part on the cell-specific offset.

In a fifteenth aspect, alone or in combination with one or more of the first through fourteenth aspects, process 900 includes receiving, from the network entity, a configuration configuring the cell-specific offset and a configuration configuring the UE-specific offset, wherein transmitting the HARQ ACK codebook is based at least in part on the UE-specific offset.

In a sixteenth aspect, alone or in combination with one or more of the first through fifteenth aspects, the scheduling offset is the cell-specific offset, and the cell-specific offset is indicated by a system information block message.

In a seventeenth aspect, alone or in combination with one or more of the first through sixteenth aspects, the scheduling offset is the UE-specific offset, and the UE-specific offset is indicated by one of a MAC-CE message, or an RRC message.

In an eighteenth aspect, alone or in combination with one or more of the first through seventeenth aspects, the scheduling offset is the zero value, and the zero value is indicated by one of a MAC-CE message, an RRC message, or an absence of signaling of an offset value.

In a nineteenth aspect, alone or in combination with one or more of the first through eighteenth aspects, the HARQ ACK codebook is transmitted via one of a physical uplink control channel or a physical uplink shared channel.

In a twentieth aspect, alone or in combination with one or more of the first through nineteenth aspects, the network entity is associated with an NTN, and the scheduling offset is associated with a propagation delay associated with the NTN.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
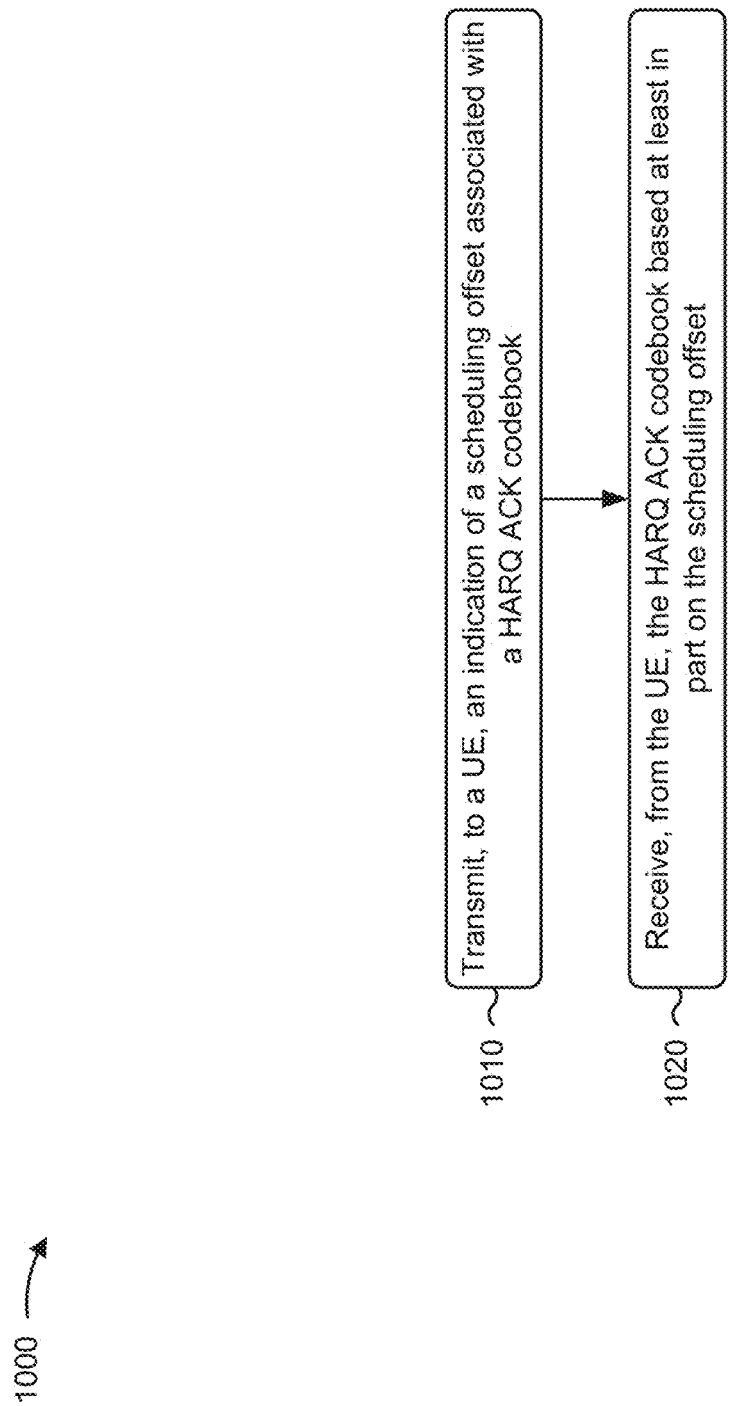
FIG. 10 is a diagram illustrating an example process performed, for example, by a network entity, in accordance with the present disclosure.

FIG. 10 is a diagram illustrating an example process 1000 performed, for example, by a network entity, in accordance with the present disclosure. Example process 1000 is an example where the network entity (e.g., network entity 710) performs operations associated with a scheduling offset for a HARQ ACK codebook.

As shown in FIG. 10, in some aspects, process 1000 may include transmitting, to a UE (e.g., UE 705), an indication of a scheduling offset associated with a HARQ ACK codebook (block 1010). For example, the network entity (e.g., using communication manager 1208 and/or transmission component 1204, depicted in FIG. 12) may transmit, to a UE, an indication of a scheduling offset associated with a HARQ ACK codebook, as described above.

As further shown in FIG. 10, in some aspects, process 1000 may include receiving, from the UE, the HARQ ACK codebook based at least in part on the scheduling offset (block 1020). For example, the network entity (e.g., using communication manager 1208 and/or reception component 1202, depicted in FIG. 12) may receive, from the UE, the HARQ ACK codebook based at least in part on the scheduling offset, as described above.

Process 1000 may include additional aspects, such as any single aspect or any combination of aspects described below and/or in connection with one or more other processes described elsewhere herein.

In a first aspect, process 1000 includes transmitting, to the UE, an indication of a feedback channel offset value associated with the HARQ ACK codebook, wherein receiving the HARQ ACK codebook is further based at least in part on the feedback channel offset value.

In a second aspect, alone or in combination with the first aspect, the HARQ ACK codebook is transmitted in an uplink slot, wherein the feedback channel offset value is associated with a downlink slot, and wherein a HARQ ACK information bit associated with the HARQ ACK codebook indicates feedback corresponding to the downlink slot.

In a third aspect, alone or in combination with one or more of the first and second aspects, the downlink slot overlaps with another uplink slot, and the other uplink slot precedes the uplink slot by a number of slots equal to a sum of the scheduling offset and the feedback channel offset value.

In a fourth aspect, alone or in combination with one or more of the first through third aspects, the downlink slot is associated with at least one of an occasion for a candidate PDSCH reception, a semi-persistent PDSCH release, or a transmission configuration indicator state update.

In a fifth aspect, alone or in combination with one or more of the first through fourth aspects, the HARQ ACK codebook is a type 1 codebook.

In a sixth aspect, alone or in combination with one or more of the first through fifth aspects, the downlink slot is associated with a monitoring occasion corresponding to at least one of a PDCCH associated with a DCI format scheduling a PDSCH reception, or a PDCCH associated with a DCI format that does not schedule a PDSCH reception and is associated with HARQ ACK information.

In a seventh aspect, alone or in combination with one or more of the first through sixth aspects, the HARQ ACK codebook is a type 2 codebook.

In an eighth aspect, alone or in combination with one or more of the first through seventh aspects, the scheduling offset is based at least in part on a signaled offset value transmitted by the network entity.

In a ninth aspect, alone or in combination with one or more of the first through eighth aspects, the scheduling offset is based at least in part on a product of the signaled offset value and a subcarrier spacing scaling factor.

In a tenth aspect, alone or in combination with one or more of the first through ninth aspects, the subcarrier spacing scaling factor is based at least in part on a numerology used for transmission of the HARQ ACK codebook.

In an eleventh aspect, alone or in combination with one or more of the first through tenth aspects, the subcarrier spacing scaling factor is based at least in part on two to a power of the numerology used for transmission of the HARQ ACK codebook.

In a twelfth aspect, alone or in combination with one or more of the first through eleventh aspects, transmitting the HARQ ACK codebook is based at least in part on an expression associated with the scheduling offset and a feedback channel offset value.

In a thirteenth aspect, alone or in combination with one or more of the first through twelfth aspects, the scheduling offset is one of a cell-specific offset, a UE-specific offset, or a zero value.

In a fourteenth aspect, alone or in combination with one or more of the first through thirteenth aspects, process 1000 includes transmitting, to the UE, a configuration configuring only the cell-specific offset, wherein receiving the HARQ ACK codebook is based at least in part on the cell-specific offset.

In a fifteenth aspect, alone or in combination with one or more of the first through fourteenth aspects, process 1000 includes transmitting, to the UE, a configuration configuring the cell-specific offset and a configuration configuring the UE-specific offset, wherein receiving the HARQ ACK codebook is based at least in part on the UE-specific offset.

In a sixteenth aspect, alone or in combination with one or more of the first through fifteenth aspects, the scheduling offset is the cell-specific offset, and the cell-specific offset is indicated by a system information block message.

In a seventeenth aspect, alone or in combination with one or more of the first through sixteenth aspects, the scheduling offset is the UE-specific offset, and the UE-specific offset is indicated by one of a MAC-CE message, or an RRC message.

In an eighteenth aspect, alone or in combination with one or more of the first through seventeenth aspects, the scheduling offset is the zero value, and the zero value is indicated by one of a MAC-CE message, an RRC message, or an absence of signaling of an offset value.

In a nineteenth aspect, alone or in combination with one or more of the first through eighteenth aspects, the HARQ ACK codebook is received via one of a physical uplink control channel or a physical uplink shared channel.

In a twentieth aspect, alone or in combination with one or more of the first through nineteenth aspects, the network entity is associated with an NTN, and the scheduling offset is associated with a propagation delay associated with the NTN.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
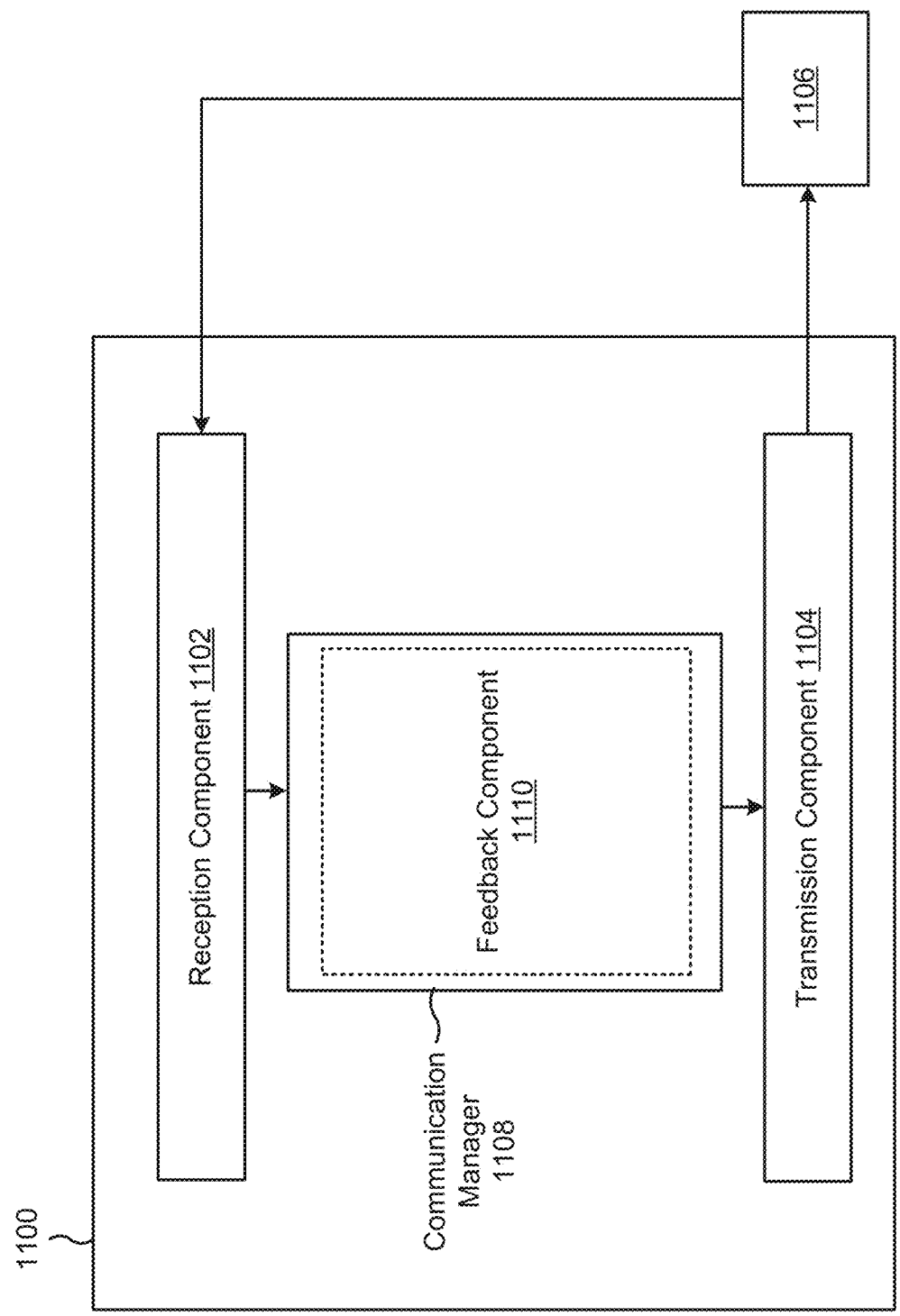
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE (e.g., UE 705), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108 (e.g., communication manager 140). The communication manager 1108 may include a feedback component 1110, among other examples.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE 120 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE 120 described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE 120 described in connection with FIG. 2. In some aspects, the transmission component 1104 may be co-located with the reception component 1102 in a transceiver.

The reception component 1102 and/or the feedback component 1110 may receive, from a network entity (e.g., network entity 710), an indication of a scheduling offset associated with a HARQ ACK codebook. The transmission component 1104 and/or the feedback component 1110 may transmit, to the network entity, the HARQ ACK codebook based at least in part on the scheduling offset.

The reception component 1102 and/or the feedback component 1110 may receive, from the network entity, an indication of a feedback channel offset value associated with the HARQ ACK codebook, and transmitting the HARQ ACK codebook may be further based at least in part on the feedback channel offset value.

The reception component 1102 and/or the feedback component 1110 may receive, from the network entity, a configuration configuring only the cell-specific offset, and transmitting the HARQ ACK codebook may be based at least in part on the cell-specific offset.

The reception component 1102 and/or the feedback component 1110 may receive, from the network entity, a configuration configuring the cell-specific offset and a configuration configuring the UE-specific offset, and transmitting the HARQ ACK codebook may be based at least in part on the UE-specific offset.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
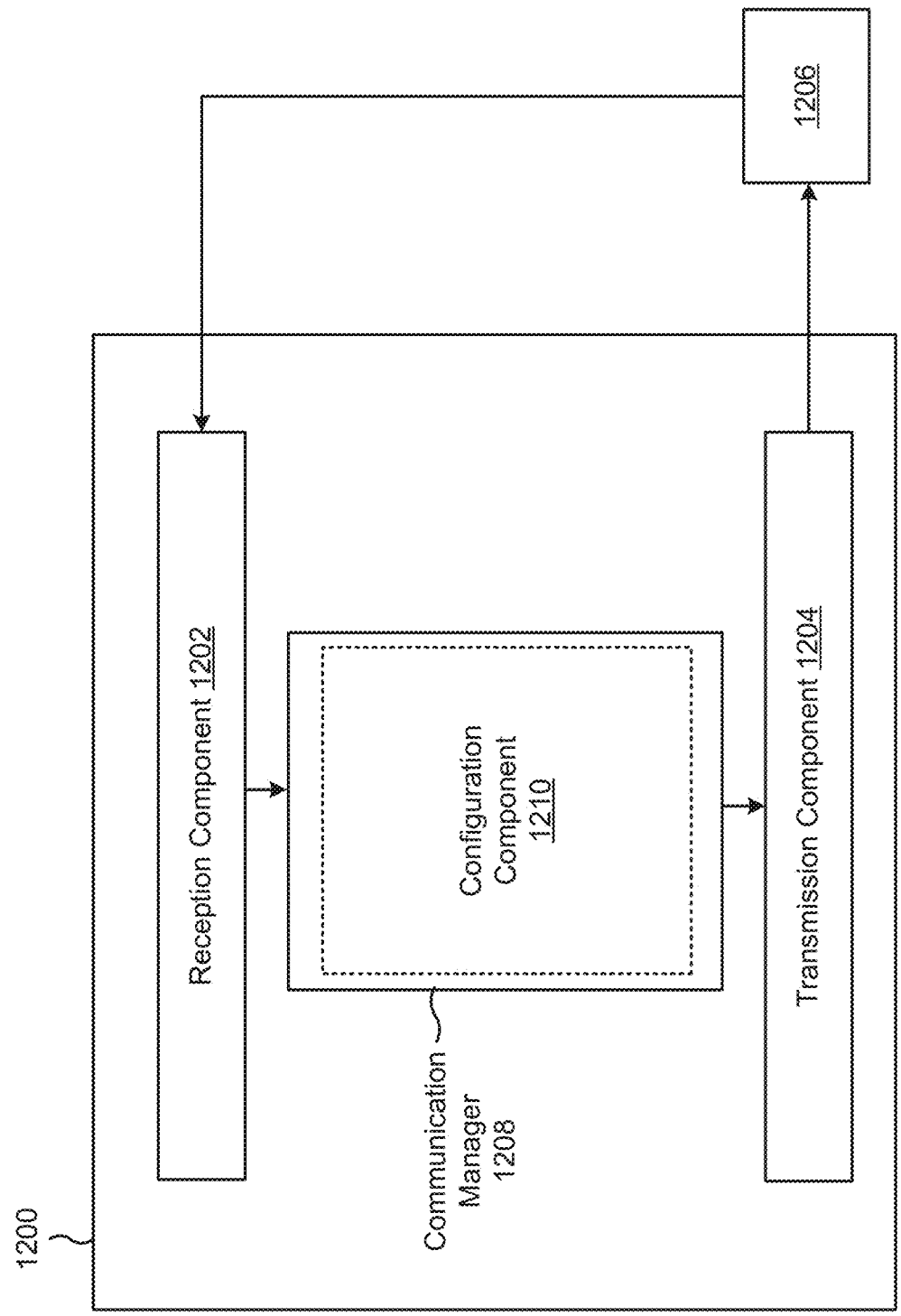
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network entity (e.g., network entity 710), or a network entity may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208 (e.g., communication manager 150). The communication manager 1208 may include a configuration component 1210, among other examples.

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station 110 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station 110 described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station 110 described in connection with FIG. 2. In some aspects, the transmission component 1204 may be co-located with the reception component 1202 in a transceiver.

The transmission component 1204 and/or the configuration component 1210 may transmit, to a UE (e.g., UE 705), an indication of a scheduling offset associated with a HARQ ACK codebook. The reception component 1202 may receive, from the UE, the HARQ ACK codebook based at least in part on the scheduling offset.

The transmission component 1204 and/or the configuration component 1210 may transmit, to the UE, an indication of a feedback channel offset value associated with the HARQ ACK codebook, and receiving the HARQ ACK codebook may be further based at least in part on the feedback channel offset value.

The transmission component 1204 and/or the configuration component 1210 may transmit, to the UE, a configuration configuring only the cell-specific offset, and receiving the HARQ ACK codebook may be based at least in part on the cell-specific offset.

The transmission component 1204 and/or the configuration component 1210 may transmit, to the UE, a configuration configuring the cell-specific offset and a configuration configuring the UE-specific offset, and receiving the HARQ ACK codebook may be based at least in part on the UE-specific offset.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving, from a network entity, an indication of a scheduling offset associated with a HARQ ACK codebook; and transmitting, to the network entity, the HARQ ACK codebook based at least in part on the scheduling offset.

Aspect 2: The method of Aspect 1, further comprising receiving, from the network entity, an indication of a feedback channel offset value associated with the HARQ ACK codebook, wherein transmitting the HARQ ACK codebook is further based at least in part on the feedback channel offset value.

Aspect 3: The method of Aspect 2, wherein the HARQ ACK codebook is transmitted in an uplink slot, wherein the feedback channel offset value is associated with a downlink slot, and wherein a HARQ ACK information bit associated with the HARQ ACK codebook indicates feedback corresponding to the downlink slot.

Aspect 4: The method of Aspect 3, wherein the downlink slot overlaps with another uplink slot, and wherein the other uplink slot precedes the uplink slot by a number of slots equal to a sum of the scheduling offset and the feedback channel offset value.

Aspect 5: The method of any of Aspects 3-4, wherein the downlink slot is associated with at least one of an occasion for a candidate PDSCH reception, a semi-persistent PDSCH release, or a transmission configuration indicator state update.

Aspect 6: The method of Aspect 5, wherein the HARQ ACK codebook is a type 1 codebook.

Aspect 7: The method of any of Aspects 3-4, wherein the downlink slot is associated with a monitoring occasion corresponding to at least one of a PDCCH associated with a DCI format scheduling a PDSCH reception, or a PDCCH associated with a DCI format that does not schedule a PDSCH reception and is associated with HARQ ACK information.

Aspect 8: The method of Aspect 7, wherein the HARQ ACK codebook is a type 2 codebook.

Aspect 9: The method of any of Aspects 1-8, wherein the scheduling offset is based at least in part on a signaled offset value received from the network entity.

Aspect 10: The method of Aspect 9, wherein the scheduling offset is based at least in part on a product of the signaled offset value and a subcarrier spacing scaling factor.

Aspect 11: The method of Aspect 10, wherein the subcarrier spacing scaling factor is based at least in part on a numerology used for transmission of the HARQ ACK codebook.

Aspect 12: The method of Aspect 11, wherein the subcarrier spacing scaling factor is based at least in part on two to a power of the numerology used for transmission of the HARQ ACK codebook.

Aspect 13: The method of any of Aspects 1-12, wherein transmitting the HARQ ACK codebook is based at least in part on an expression associated with the scheduling offset and a feedback channel offset value.

Aspect 14: The method of any of Aspects 1-13, wherein the scheduling offset is one of a cell-specific offset, a UE-specific offset, or a zero value.

Aspect 15: The method of Aspect 14, further comprising receiving, from the network entity, a configuration configuring only the cell-specific offset, wherein transmitting the HARQ ACK codebook is based at least in part on the cell-specific offset.

Aspect 16: The method of Aspect 14, further comprising receiving, from the network entity, a configuration configuring the cell-specific offset and a configuration configuring the UE-specific offset, wherein transmitting the HARQ ACK codebook is based at least in part on the UE-specific offset.

Aspect 17: The method of Aspect 14, wherein the scheduling offset is the cell-specific offset, and wherein the cell-specific offset is indicated by a system information block message.

Aspect 18: The method of Aspect 14, wherein the scheduling offset is the UE-specific offset, and wherein the UE-specific offset is indicated by one of a MAC-CE message, or an RRC message.

Aspect 19: The method of Aspect 14, wherein the scheduling offset is the zero value, and wherein the zero value is indicated by one of a MAC-CE message, an RRC message, or an absence of signaling of an offset value.

Aspect 20: The method of any of Aspects 1-19, wherein the HARQ ACK codebook is transmitted via one of a physical uplink control channel or a physical uplink shared channel.

Aspect 21: The method of any of Aspects 1-20, wherein the network entity is associated with an NTN, and wherein the scheduling offset is associated with a propagation delay associated with the NTN.

Aspect 22: A method of wireless communication performed by a network entity, comprising: transmitting, to a UE, an indication of a scheduling offset associated with a HARQ ACK codebook; and receiving, from the UE, the HARQ ACK codebook based at least in part on the scheduling offset.

Aspect 23: The method of Aspect 22, further comprising transmitting, to the UE, an indication of a feedback channel offset value associated with the HARQ ACK codebook, wherein receiving the HARQ ACK codebook is further based at least in part on the feedback channel offset value.

Aspect 24: The method of Aspect 23, wherein the HARQ ACK codebook is transmitted in an uplink slot, wherein the feedback channel offset value is associated with a downlink slot, and wherein a HARQ ACK information bit associated with the HARQ ACK codebook indicates feedback corresponding to the downlink slot.

Aspect 25: The method of Aspect 24, wherein the downlink slot overlaps with another uplink slot, and wherein the other uplink slot precedes the uplink slot by a number of slots equal to a sum of the scheduling offset and the feedback channel offset value.

Aspect 26: The method of any of Aspects 24-25, wherein the downlink slot is associated with at least one of an occasion for a candidate PDSCH reception, a semi-persistent PDSCH release, or a transmission configuration indicator state update.

Aspect 27: The method of Aspect 26, wherein the HARQ ACK codebook is a type 1 codebook.

Aspect 28: The method of Aspect 24, wherein the downlink slot is associated with a monitoring occasion corresponding to at least one of a PDCCH associated with a DCI format scheduling a PDSCH reception, or a PDCCH associated with a DCI format that does not schedule a PDSCH reception and is associated with HARQ ACK information.

Aspect 29: The method of Aspect 28, wherein the HARQ ACK codebook is a type 2 codebook.

Aspect 30: The method of any of Aspects 22-19, wherein the scheduling offset is based at least in part on a signaled offset value transmitted by the network entity.

Aspect 31: The method of Aspect 30, wherein the scheduling offset is based at least in part on a product of the signaled offset value and a subcarrier spacing scaling factor.

Aspect 32: The method of Aspect 31, wherein the subcarrier spacing scaling factor is based at least in part on a numerology used for transmission of the HARQ ACK codebook.

Aspect 33: The method of Aspect 32, wherein the subcarrier spacing scaling factor is based at least in part on two to a power of the numerology used for transmission of the HARQ ACK codebook.

Aspect 34: The method of any of Aspects 22-33, wherein transmitting the HARQ ACK codebook is based at least in part on an expression associated with the scheduling offset and a feedback channel offset value.

Aspect 35: The method of any of Aspects 22-34, wherein the scheduling offset is one of a cell-specific offset, a UE-specific offset, or a zero value.

Aspect 36: The method of Aspect 35, further comprising transmitting, to the UE, a configuration configuring only the cell-specific offset, wherein receiving the HARQ ACK codebook is based at least in part on the cell-specific offset.

Aspect 37: The method of Aspect 35, further comprising transmitting, to the UE, a configuration configuring the cell-specific offset and a configuration configuring the UE-specific offset, wherein receiving the HARQ ACK codebook is based at least in part on the UE-specific offset.

Aspect 38: The method of Aspect 35, wherein the scheduling offset is the cell-specific offset, and wherein the cell-specific offset is indicated by a system information block message.

Aspect 39: The method of Aspect 35, wherein the scheduling offset is the UE-specific offset, and wherein the UE-specific offset is indicated by one of a MAC-CE message, or an RRC message.

Aspect 40: The method of Aspect 35, wherein the scheduling offset is the zero value, and wherein the zero value is indicated by one of a MAC-CE message, an RRC message, or an absence of signaling of an offset value.

Aspect 41: The method of any of Aspects 22-40, wherein the HARQ ACK codebook is received via one of a physical uplink control channel or a physical uplink shared channel.

Aspect 42: The method of any of Aspects 22-41, wherein the network entity is associated with an NTN, and wherein the scheduling offset is associated with a propagation delay associated with the NTN.

Aspect 43: An apparatus for wireless communication at a device, comprising a processor; memory coupled with the processor; and instructions stored in the memory and executable by the processor to cause the apparatus to perform the method of one or more of Aspects 1-21.

Aspect 44: A device for wireless communication, comprising a memory and one or more processors coupled to the memory, the one or more processors configured to perform the method of one or more of Aspects 1-21.

Aspect 45: An apparatus for wireless communication, comprising at least one means for performing the method of one or more of Aspects 1-21.

Aspect 46: A non-transitory computer-readable medium storing code for wireless communication, the code comprising instructions executable by a processor to perform the method of one or more of Aspects 1-21.

Aspect 47: A non-transitory computer-readable medium storing a set of instructions for wireless communication, the set of instructions comprising one or more instructions that, when executed by one or more processors of a device, cause the device to perform the method of one or more of Aspects 1-21.

Aspect 48: An apparatus for wireless communication at a device, comprising a processor; memory coupled with the processor; and instructions stored in the memory and executable by the processor to cause the apparatus to perform the method of one or more of Aspects 22-42.

Aspect 49: A device for wireless communication, comprising a memory and one or more processors coupled to the memory, the one or more processors configured to perform the method of one or more of Aspects 22-42.

Aspect 50: An apparatus for wireless communication, comprising at least one means for performing the method of one or more of Aspects 22-42.

Aspect 51: A non-transitory computer-readable medium storing code for wireless communication, the code comprising instructions executable by a processor to perform the method of one or more of Aspects 22-42.

Aspect 52: A non-transitory computer-readable medium storing a set of instructions for wireless communication, the set of instructions comprising one or more instructions that, when executed by one or more processors of a device, cause the device to perform the method of one or more of Aspects 22-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive, from a network entity, an indication of a scheduling offset associated with a hybrid automatic repeat request (HARQ) acknowledgement (ACK) codebook, wherein the scheduling offset is based at least in part on a product of a signaled offset value, received from the network entity, and a subcarrier spacing scaling factor; and
      transmit, to the network entity, the HARQ ACK codebook based at least in part on the scheduling offset.

2. The apparatus of claim 1, wherein the one or more processors are further configured to receive, from the network entity, an indication of a feedback channel offset value associated with the HARQ ACK codebook, wherein transmitting the HARQ ACK codebook is further based at least in part on the feedback channel offset value.

3. The apparatus of claim 2, wherein the HARQ ACK codebook is transmitted in an uplink slot, wherein the feedback channel offset value is associated with a downlink slot, and wherein a HARQ ACK information bit associated with the HARQ ACK codebook indicates feedback corresponding to the downlink slot.

4. The apparatus of claim 3, wherein the downlink slot overlaps with another uplink slot, and wherein the other uplink slot precedes the uplink slot by a number of slots equal to a sum of the scheduling offset and the feedback channel offset value.

5. The apparatus of claim 3, wherein the downlink slot is associated with at least one of an occasion for a candidate physical downlink shared channel (PDSCH) reception, a semi-persistent PDSCH release, or a transmission configuration indicator state update.

6. The apparatus of claim 5, wherein the HARQ ACK codebook is a type 1 codebook.

7. The apparatus of claim 3, wherein the downlink slot is associated with a monitoring occasion corresponding to at least one of a physical downlink control channel (PDCCH) associated with a downlink control information (DCI) format scheduling a physical downlink shared channel (PDSCH) reception, or a PDCCH associated with a DCI format that does not schedule a PDSCH reception and is associated with HARQ ACK information.

8. The apparatus of claim 7, wherein the HARQ ACK codebook is a type 2 codebook.

9. The apparatus of claim 1, wherein the subcarrier spacing scaling factor is based at least in part on a numerology used for transmission of the HARQ ACK codebook.

10. The apparatus of claim 9, wherein the subcarrier spacing scaling factor is based at least in part on two to a power of the numerology used for transmission of the HARQ ACK codebook.

11. The apparatus of claim 1, wherein transmitting the HARQ ACK codebook is based at least in part on an expression associated with the scheduling offset and a feedback channel offset value.

12. The apparatus of claim 1, wherein the scheduling offset is one of a cell-specific offset, a UE-specific offset, or a zero value.

13. The apparatus of claim 12, wherein the one or more processors are further configured to receive, from the network entity, a configuration configuring only the cell-specific offset, wherein transmitting the HARQ ACK codebook is based at least in part on the cell-specific offset.

14. The apparatus of claim 12, wherein the one or more processors are further configured to receive, from the network entity, a configuration configuring the cell-specific offset and a configuration configuring the UE-specific offset, wherein transmitting the HARQ ACK codebook is based at least in part on the UE-specific offset.

15. The apparatus of claim 12, wherein the scheduling offset is the cell-specific offset, and wherein the cell-specific offset is indicated by a system information block message.

16. The apparatus of claim 12, wherein the scheduling offset is the UE-specific offset, and wherein the UE-specific offset is indicated by one of a medium access control (MAC) control element (MAC-CE) message, or a radio resource control (RRC) message.

17. The apparatus of claim 12, wherein the scheduling offset is the zero value, and wherein the zero value is indicated by one of a medium access control (MAC) control element (MAC-CE) message, a radio resource control (RRC) message, or an absence of signaling of an offset value.

18. The apparatus of claim 1, wherein the HARQ ACK codebook is transmitted via one of a physical uplink control channel or a physical uplink shared channel.

19. The apparatus of claim 1, wherein the network entity is associated with a non-terrestrial network (NTN), and wherein the scheduling offset is associated with a propagation delay associated with the NTN.

20. An apparatus for wireless communication at a network entity for wireless communication, comprising:
a memory; and
one or more processors, coupled to the memory, configured to:
transmit, to a user equipment (UE), an indication of a scheduling offset associated with a hybrid automatic repeat request (HARQ) acknowledgement (ACK) codebook, wherein the scheduling offset is based at least in part on a product of a signaled offset value, transmitted by the network entity, and a subcarrier spacing scaling factor; and
receive, from the UE, the HARQ ACK codebook based at least in part on the scheduling offset.

21. The apparatus of claim 20, wherein the subcarrier spacing scaling factor is based at least in part on a numerology used for transmission of the HARQ ACK codebook.

22. The apparatus of claim 21, wherein the subcarrier spacing scaling factor is based at least in part on two to a power of the numerology used for transmission of the HARQ ACK codebook.

23. The apparatus of claim 20, wherein transmitting the HARQ ACK codebook is based at least in part on an expression associated with the scheduling offset and a feedback channel offset value.

24. A method of wireless communication performed by a user equipment (UE), comprising:
receiving, from a network entity, an indication of a scheduling offset associated with a hybrid automatic repeat request (HARQ) acknowledgement (ACK) codebook, wherein the scheduling offset is based at least in part on a product of a signaled offset value, received from the network entity, and a subcarrier spacing scaling factor; and
transmitting, to the network entity, the HARQ ACK codebook based at least in part on the scheduling offset.

25. The method of claim 24, wherein the subcarrier spacing scaling factor is based at least in part on two to a power of a numerology used for transmission of the HARQ ACK codebook.

26. The method of claim 24, further comprising:
transmitting, to the network entity, an indication of a feedback channel offset value associated with the HARQ ACK codebook, wherein transmitting the HARQ ACK codebook is further based at least in part on the feedback channel offset value.

27. The method of claim 26, wherein the HARQ ACK codebook is transmitted in an uplink slot, wherein the feedback channel offset value is associated with a downlink slot, and wherein a HARQ ACK information bit associated with the HARQ ACK codebook indicates feedback corresponding to the downlink slot.

28. A method of wireless communication performed by a network entity, comprising:
transmitting, to a user equipment (UE), an indication of a scheduling offset associated with a hybrid automatic repeat request (HARQ) acknowledgement (ACK) codebook, wherein the scheduling offset is based at least in part on a product of a signaled offset value, transmitted by the network entity, and a subcarrier spacing scaling factor; and receiving, from the UE, the HARQ ACK codebook based at least in part on the scheduling offset.

29. The method of claim 28, wherein the subcarrier spacing scaling factor is based at least in part on two to a power of a numerology used for transmission of the HARQ ACK codebook.

30. The method of claim 28, further comprising:
receiving, from the network entity, an indication of a feedback channel offset value associated with the HARQ ACK codebook, wherein transmitting the HARQ ACK codebook is further based at least in part on the feedback channel offset value.

\* \* \* \* \*